Feb. 2, 1960
J. H. DYER ET AL
2,923,420
CONVEYOR CONTROL SYSTEMS
Filed Sept. 20, 1957
9 Sheets-Sheet 6
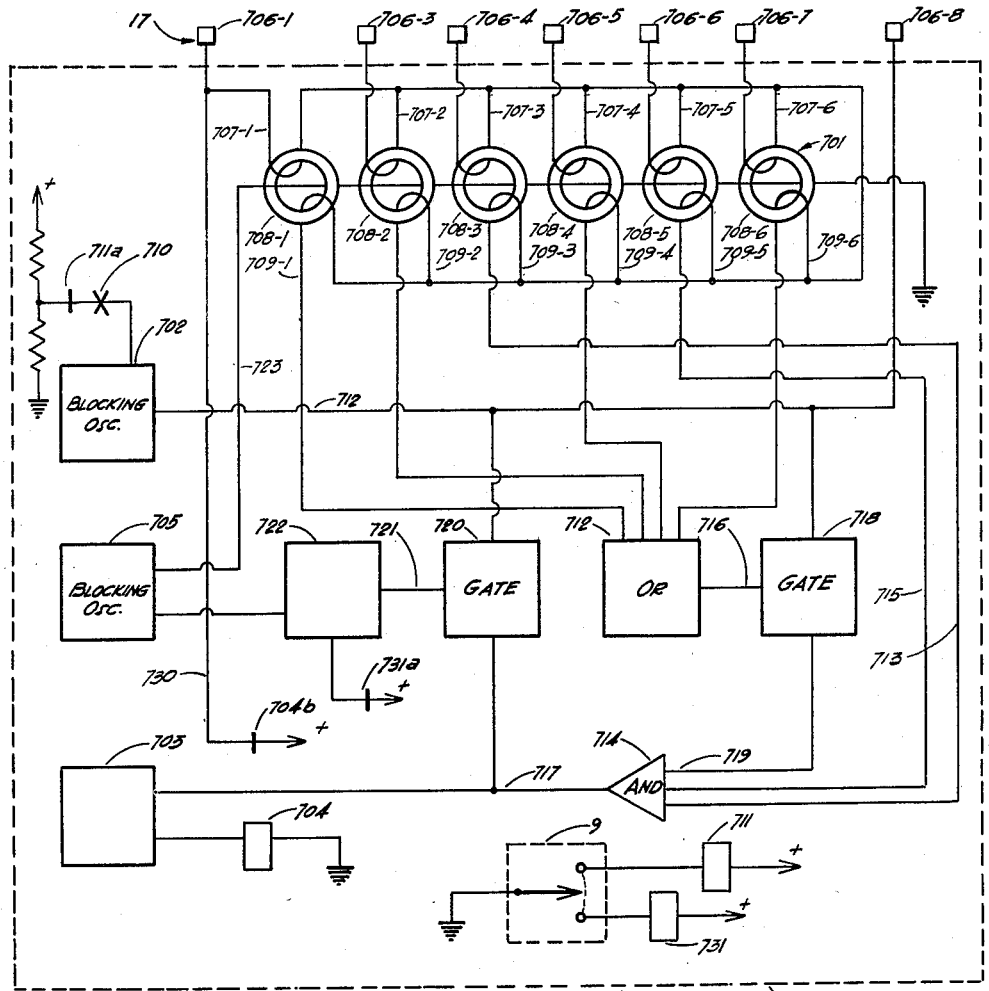
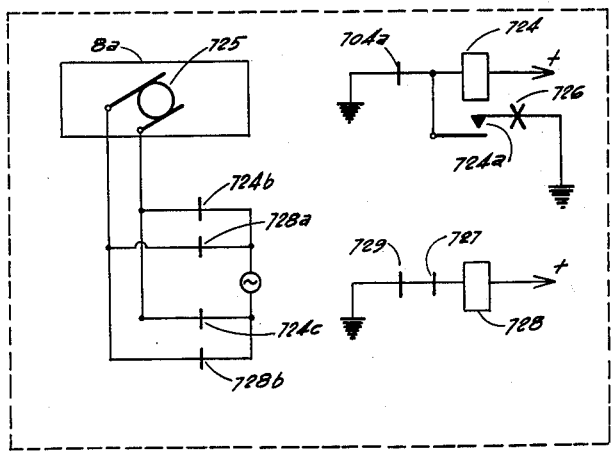
FIG-7
INVENTORS
JOHN H. DYER
JAMES R. HORSCH
ALLEN E. SMOLL
BY John C. Black
ATTORNEY

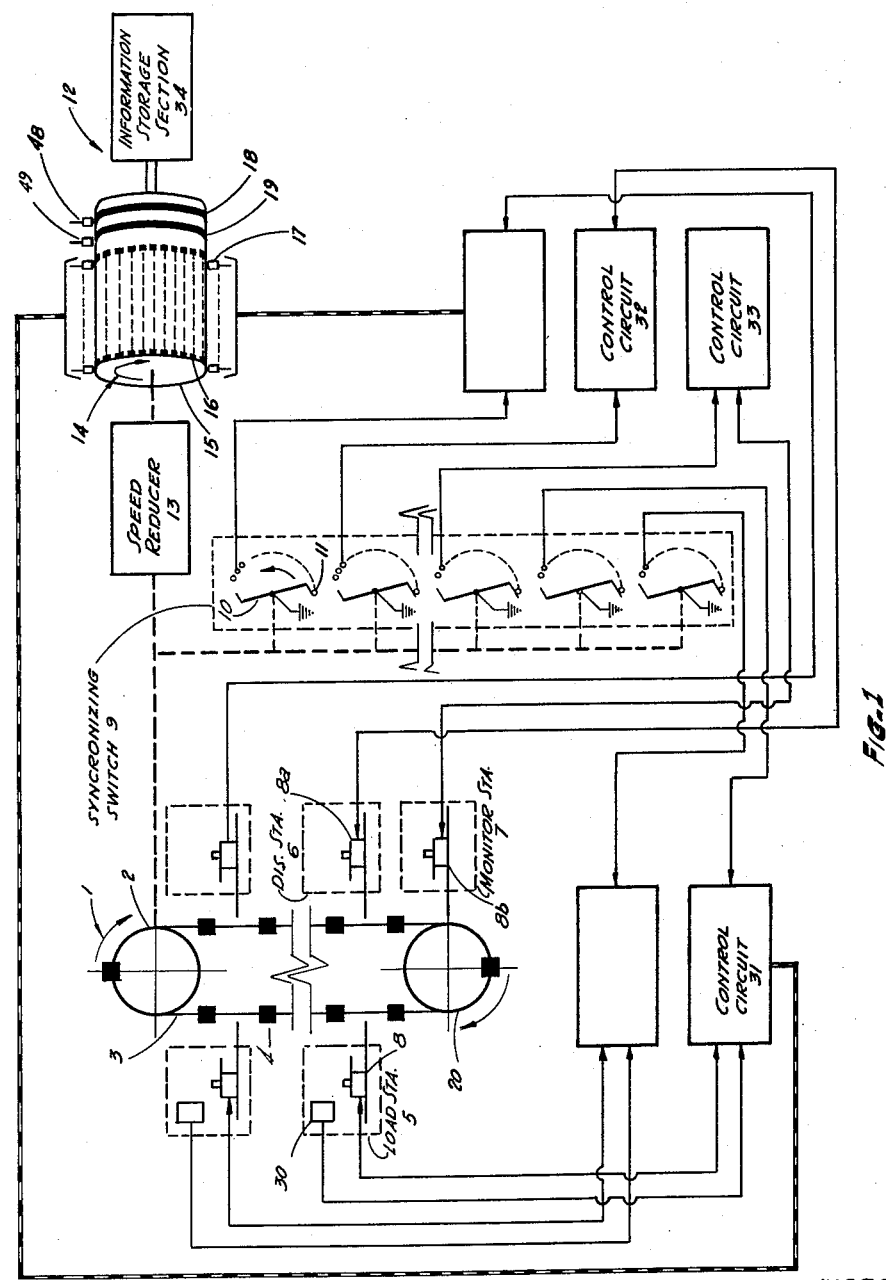

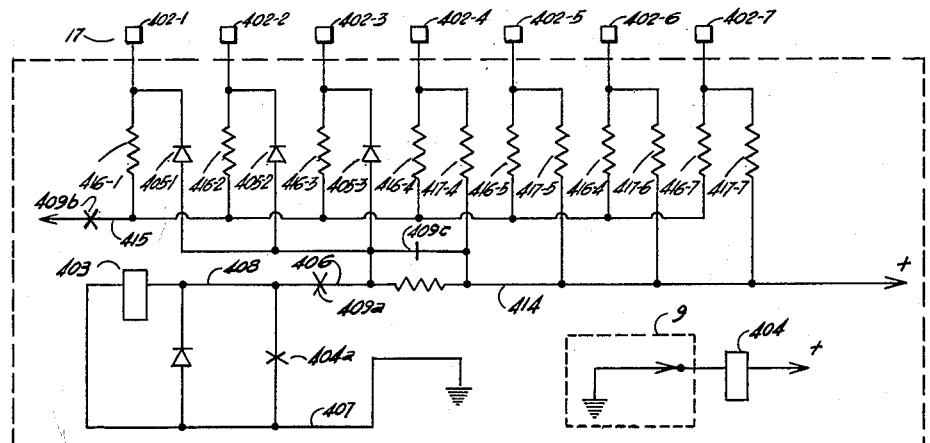
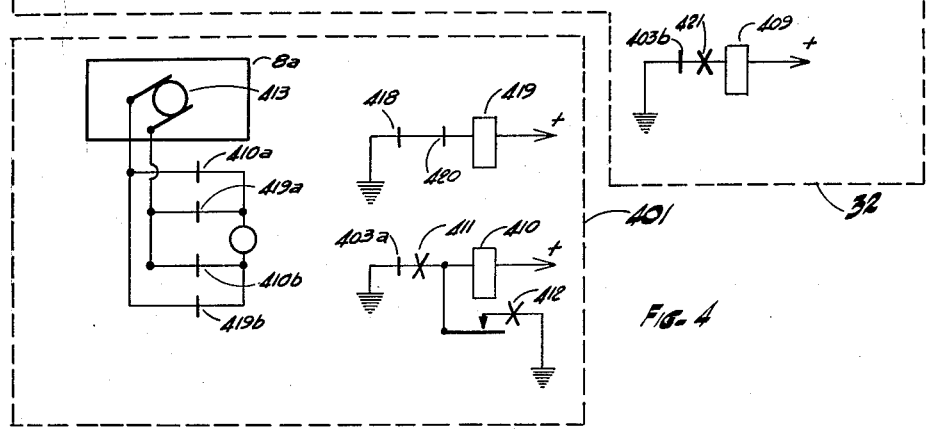
FIG. 4
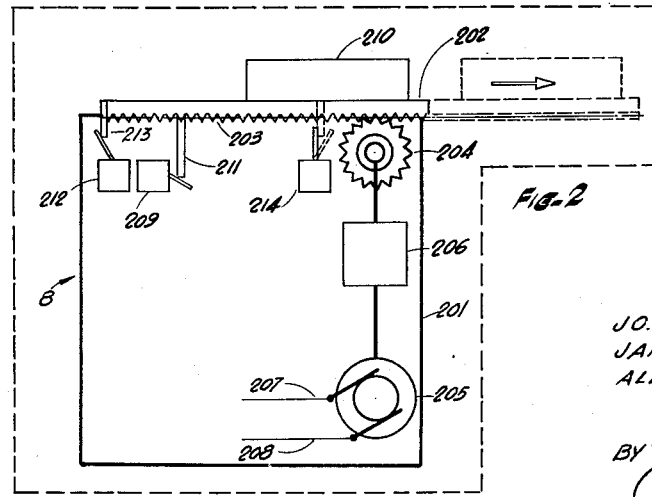
FIG. 2

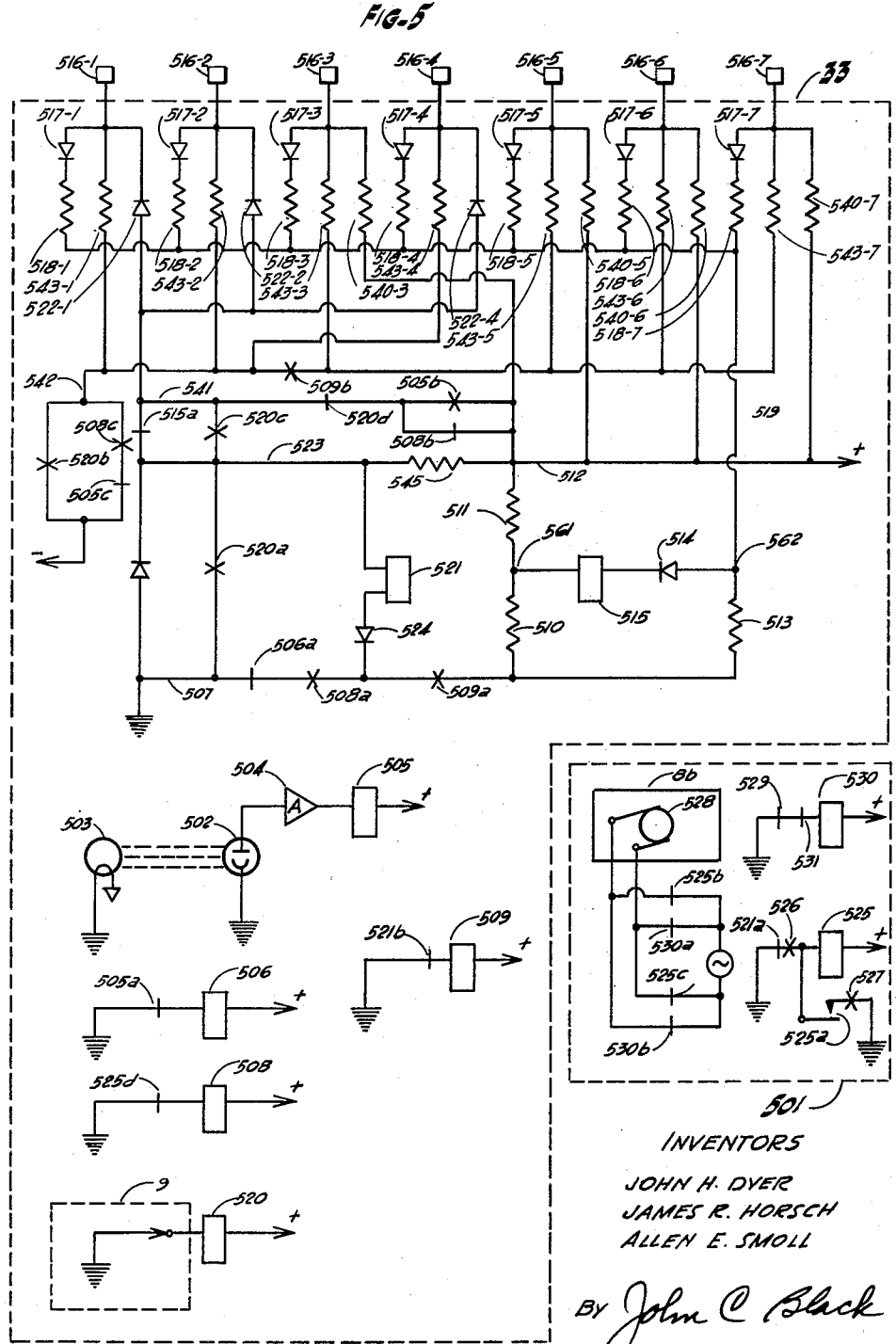

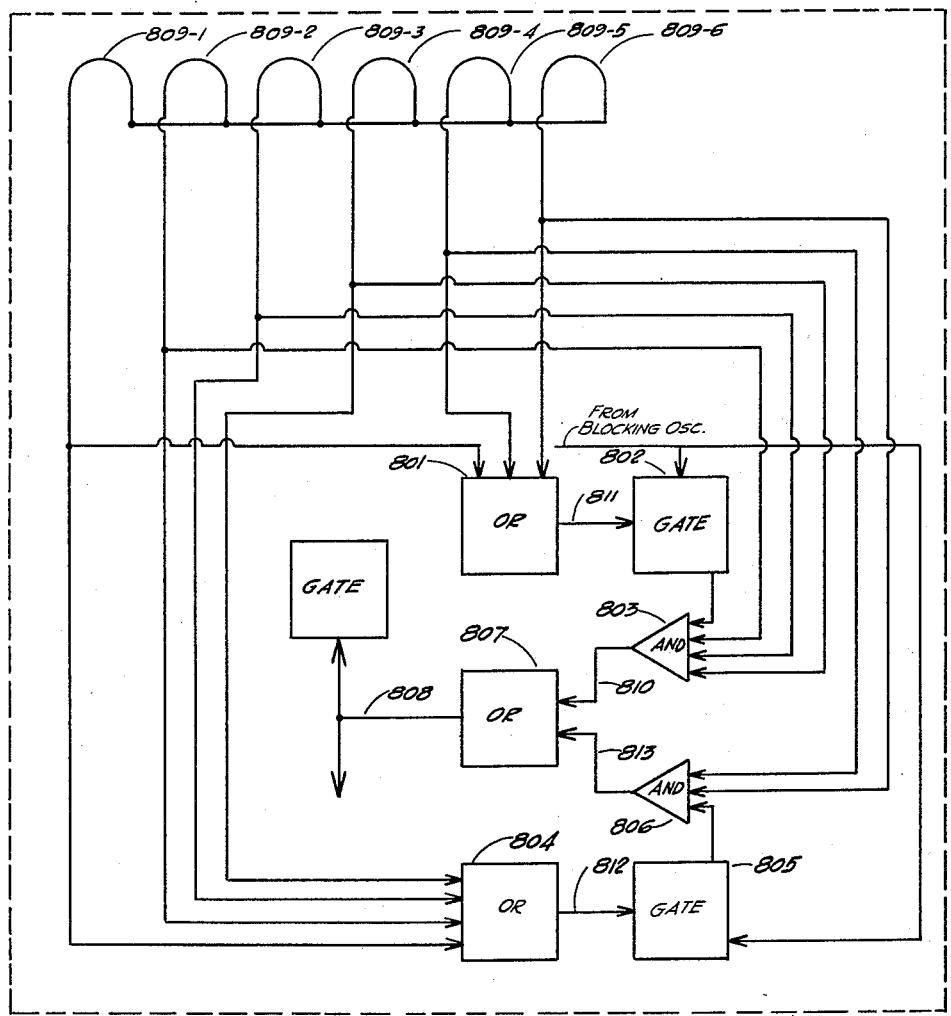
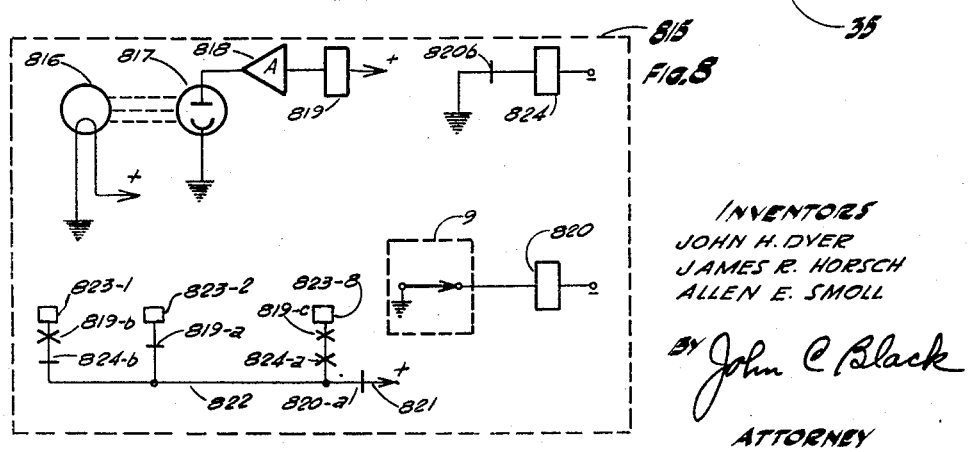
FIG. 8
INVENTORS
JOHN H. DYER
JAMES R. HORSCH
ALLEN E. SMOLL
BY John C Black
ATTORNEY

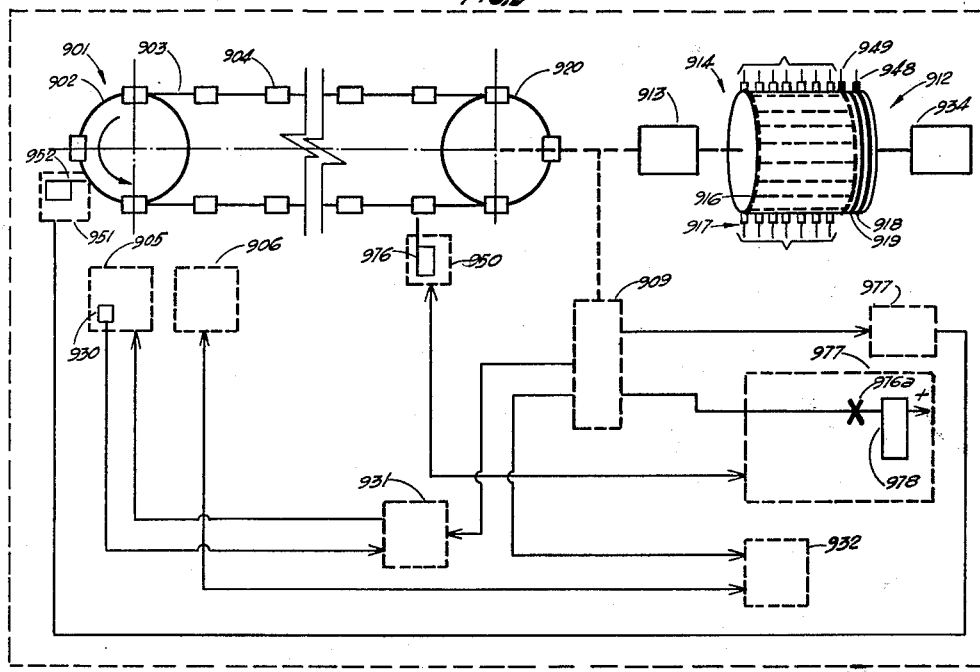
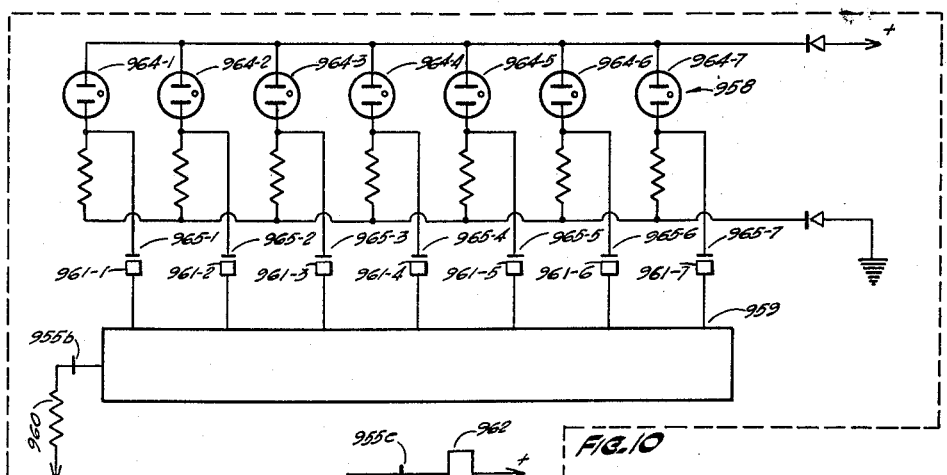
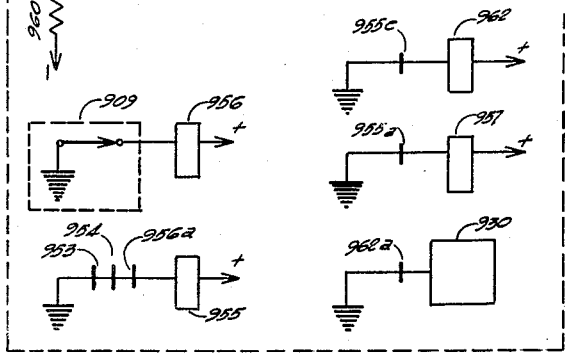

Feb. 2, 1960  J. H. DYER ET AL  2,923,420
CONVEYOR CONTROL SYSTEMS
Filed Sept. 20, 1957  9 Sheets-Sheet 9
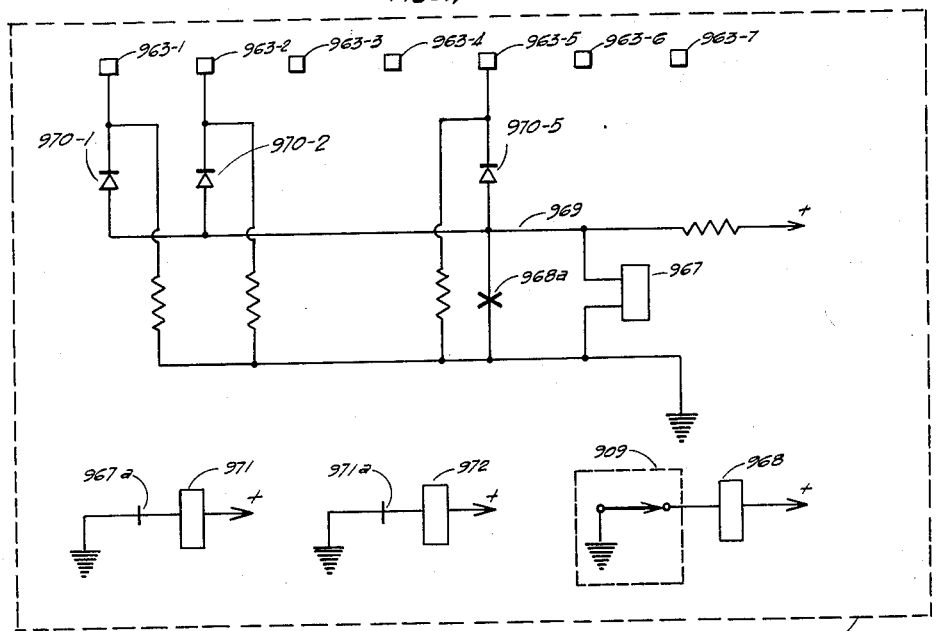
FIG. 11
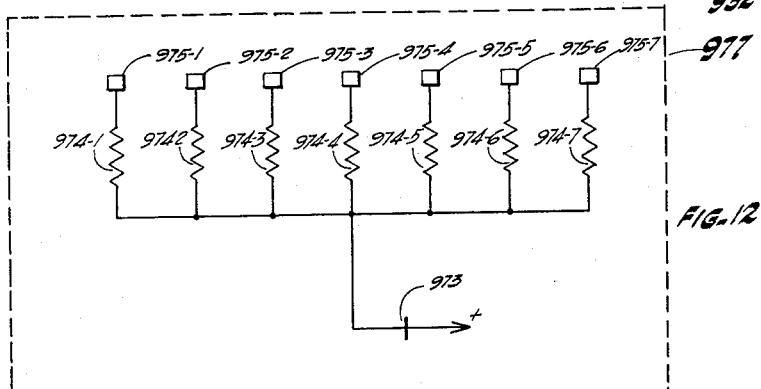
FIG. 12
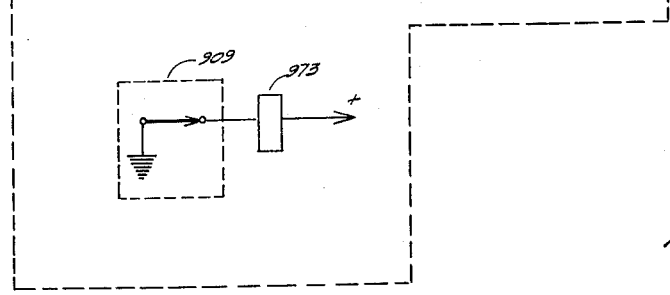
INVENTORS
JOHN H. DYER
JAMES R. HORSCH
ALLEN E. SMOLL
By John C. Black
ATTORNEY

2,923,420

CONVEYOR CONTROL SYSTEMS

John H. Dyer, St. Petersburg, Fla., James R. Horsch, Elmhurst, Ill., and Allen E. Smoll, Arlington, Mass., assignors to Stewart-Warner Corporation, Chicago, Ill., a corporation of Virginia Application September 20, 1957, Serial No. 685,338

39 Claims. (Cl. 214—11)

This invention relates to improved control systems for conveyors.

It is an object of the present invention to provide an improved control means for semi-automatically routing objects from a conveyor load station to any one of a plurality of conveyor discharge stations, which means will provide reliable, trouble-free operation with minimum maintenance.

It is a further object of the invention to provide in control means of the type described above means for monitoring conveyor carriers for detection of malfunctioning control equipment and for providing discharge of objects at a predetermined discharge station when their routing is improper due to malfunctioning of the control equipment.

A feature of the present invention is the use of a synchronizing switch which provides for very accurate control of object transfer functions, flexibility of design in the control equipment and prevention of certain routing faults.

Another feature is the use of a monitor including a photosensitive device for detecting a full or empty condition of conveyor carriers, circuits for determining a proper or improper routing of packages and circuits for causing the discharge of improperly routed packages to a predetermined discharge station.

Another feature is the use of neon tubes in one embodiment to store routing information while objects are in transit on conveyor carriers.

Another feature is the use of bistable ferrite cores as information storage devices and another embodiment.

Other objects and features will be evident upon a perusal of the following description in which:

Fig. 1 shows a diagrammatic view of a vertical conveyor system of the type in which each routed object is held on a conveyor load transporting carrier through one or more cycles of the conveyor until the desired discharge station can accept the object;

Fig. 2 diagrammatically shows the transfer mechanism which is used to load objects on and unload objects from the conveyor carriers of the system shown in Fig. 1;

Fig. 3 shows in detail typical loading control circuits for the system shown in Fig. 1 wherein neon tubes are used to store information;

Figs. 4 and 5, respectively, show in detail typical discharge control circuits and the monitor circuits for the system shown in Fig. 1 wherein neon tubes are used to store information;

Figs. 6, 7 and 8 show circuits similar to those shown in Figs. 3–5, respectively, using ferrite cores to store information;

Fig. 9 shows a diagrammatic view of a horizontal conveyor system of the type in which objects loaded on carriers must be discharged during the succeeding cycle of conveyor operation;

Fig. 10 shows circuits for the loading control circuits for the system shown in Fig. 9;

Fig. 11 shows typical discharge control circuits for the system shown in Fig. 9; and Fig. 12 shows supervisory circuits for the system shown in Fig. 9.

Figure 3:
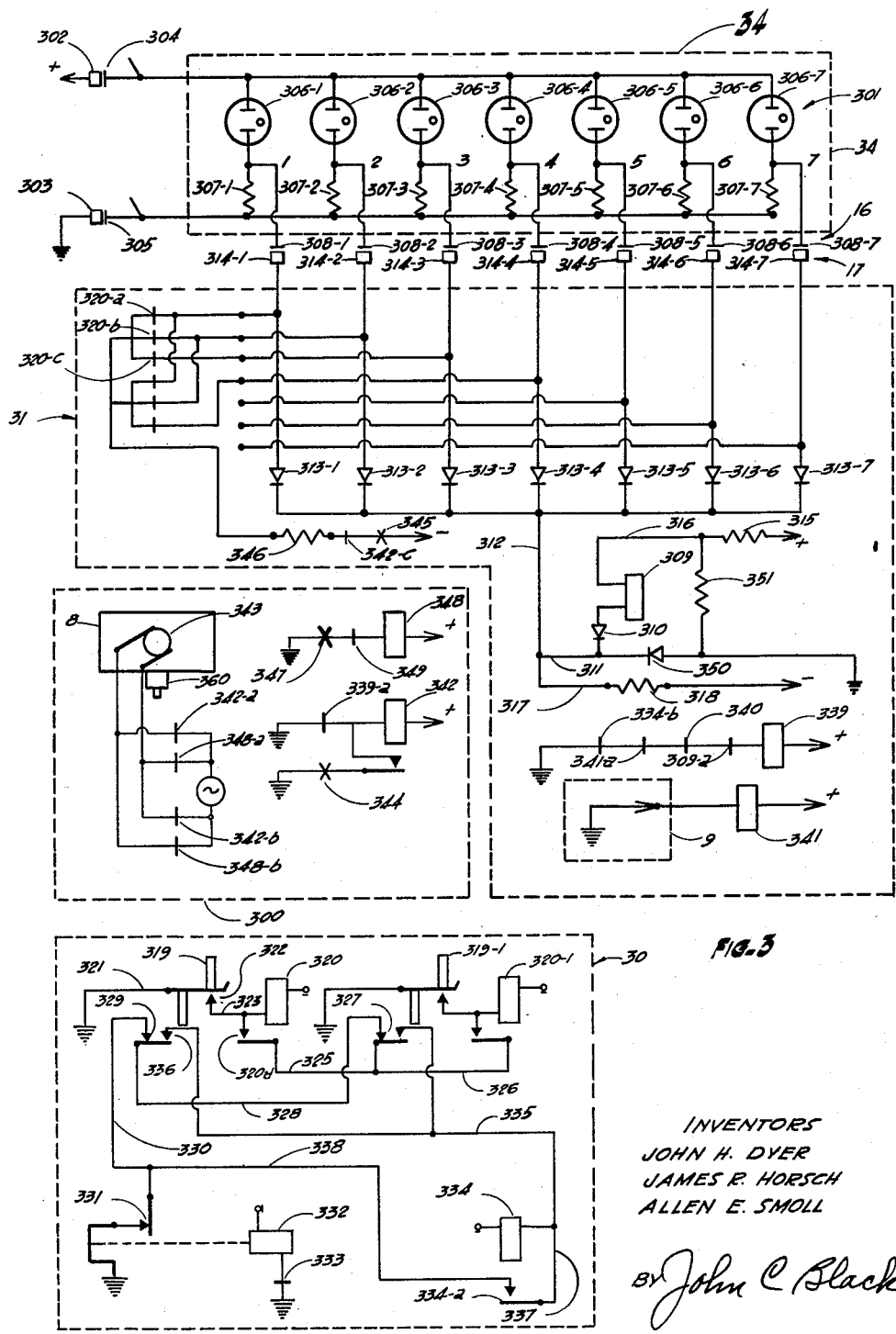

The applicant has provided in two embodiments improved semi-automatic routing control circuits for an endless vertical conveyor system in which objects routed to a predetermined discharge station are kept on a conveyor carrier until the predetermined discharge station has room to receive the object and does, in fact, remove the object from the carrier even though the object may be held on the carrier during several cycles of the conveyor. For purposes of this application, this will be called a recycling system.

A third embodiment provides improved semi-automatic routing control circuits for an endless horizontal conveyor in which objects, loaded on the conveyor, must be unloaded within 1 cycle of the conveyor. For purposes of this application, this will be called a single cycle delivery system.

These types of conveyor systems are disclosed as examples with which the improved control circuits can be used; and it is to be understood that the invention as set forth in the appended claims is not to be limited thereto.

In general, the recycling system includes a conventional conveyor having a plurality of equally spaced carriers thereon. When an object is to be sent from a load station to a predetermined discharge station, an operator at the load station pushes a discharge station selector button corresponding to the predetermined discharge station. He then places the object in a tray and in turn places the tray on a transfer mechanism at the load station.

Control circuits individual to the load station cause the transfer mechanism to deposit the tray on the next empty carrier passing the load station. The control circuits in cooperation with circuits prepared by the selector button transfer a binary permutation code, assigned to the predetermined discharge station, to a memory drum.

When the carrier with the object approaches the predetermined discharge station, control circuits individual to the station detect the assigned code permutations; and, if there is room for the object at the station, the control circuits will cause a transfer mechanism at the station to remove the object from the carrier. If there is no room for the object at the station, the object will be held on the carrier until room is provided by an operator removing previously received objects from the station.

In the event that malfunctioning of the equipment causes a nonexistent code to be transferred to the memory drum, control circuits at a monitor station cause the unloading of the object routed with the nonexistent code.

In general, the single cycle discharge system is similar except that a monitor station is not required.

*Recycling system—Description of mechanical details*

More specifically, the recycling system includes a conveyor 1 (Fig. 1) having a pair of rotatably mounted gear wheels 2 and 20 at the extreme ends thereof. A motor (not shown) is connected to wheel 2 for moving the conveyor at a constant speed with wheel 2 rotating in a clockwise direction about its axis. An endless chain 3 supporting equally spaced carriers 4 is operatively secured to the wheels 2 and 20.

In a normal installation the conveyor would be installed in a multifloor building with load stations such as load station 5 on each floor, discharge stations, such as discharge station 6 on each floor and a monitor station, such as monitor station 7, in the lowest sub-basement.

Each load, discharge and monitor station will have associated therewith a power operated transfer mechanism, such as mechanism 8 of load station 5, and a manually operable discharge station selector, such as selector 30. Each load station has a control circuit, such as control circuit 31, individually associated therewith; each discharge station has a control circuit, such as circuit 32 individually associated therewith; and the monitor station has a control circuit 33.

The control circuits control the operation of the transfer mechanisms, such as mechanism 8 at station 5, to place objects on and remove objects from the carriers 4.

A memory drum assembly 12 is provided for storing routing information during routing of objects between load and discharge stations. The assembly 12 is operatively connected to the conveyor 1 through a speed reducer 13 to provide one revolution of the drum 12 for each cycle of the conveyor. Appropriate circuits interconnect the station control circuits and the memory drum assembly 12 so that the load station control circuits can transfer routing information to assembly 12 during loading of carriers 4 and so that discharge control circuits can detect the routing information in the assembly 12 to unload the carriers 4 at the proper discharge stations.

A multilevel synchronizing switch 9 is operatively connected to the conveyor in a manner such that the wipers 10 engage all contacts of their respective contact sets 11 once during travel of the conveyor a distance equal to the spacing between carriers 4. A wiper 10 and contact set 11 are provided for each station. As will be described in detail later, the synchronizing switch 9 provides minutely accurate synchronization between movement of the carriers by the load, discharge and monitor stations and operation of the transfer mechanisms into the carrier path during loading and unloading operations. It permits transfer mechanism operations to be initiated only when carriers 4 are in predetermined positions adjacent the load discharge and monitor stations and only when contact brush sets of drum 12 are in perfect alignment.

More specifically, the memory drum assembly 12 comprises a commutator and slip ring section 14, a multichannel information storage section 34 and appropriate electrical connections therebetween. The storage section 34 will be described in detail later.

The commutator and slip-ring section 14 includes a rotatably mounted hollow cylindrical element 15 having contact sets 16, and slip rings 18 and 19. Section 14 further includes stator brush sets 17 disposed around periphery of element 15 for engagement with the contact sets 16. Section 14 also includes a pair of stator brushes 48 and 49 disposed for continuous engagement with slip rings 18 and 19 for supplying power to the memory drum assembly 12.

The contacts in each set 16 are aligned on the outer periphery of element 15 parallel to its axis. The contact sets 16 are disposed in radially spaced relationship around the periphery of the element 15. The contact sets 16 are equally spaced, and each contact set corresponds to a respective one of the conveyor carriers 4.

The stator brush sets 17 are disposed around the periphery of element 15 for engagement with contact sets 16. A stator brush set 17 is provided for each load station, each discharge station and the monitor station; and the stator brush sets are positioned in radially spaced relationship around the element 15 in the same order that their respective load, discharge and monitor stations appear along the cover path. The stator brush sets are preferably spaced apart in proportion to the spacing of their respective load discharge and monitor stations along the conveyor path.

As each of the carriers 4 approaches one of the stations, its respective contact set 16 engages the stator brush set 17 corresponding to the particular station it is approaching and remains in engagement for a predetermined time interval thereafter. This time interval is determined by the length of the contacts and the brushes as well as the rate of relative movement therebetween. By making the time interval during which the contacts and brushes are in engagement an appreciable amount of time—a substantial portion of the time interval during which the conveyor moves a distance equal to the spacing between carriers—and by using the synchronizing switch 9 in a manner discussed below, the cost of making the slip ring and commutator section 14 is greatly reduced because extreme accuracy and alignment of contacts and brushes in the various sets is not necessary.

The synchronizing switch 9 will now be described in greater detail. As noted above, a wiper 10 and a corresponding contact set 11 are provided for each station. Each contact set 11 will include as many contacts as are necessary to give the accuracy of control desired. For example, a typical installation might have a conveyor with a carrier movement speed of 100 feet per minute, with carriers spaced 10 feet apart, and with 20 contacts provided in each contact set 11. A wiper 10 therefore has twenty contacts it can engage while a carrier, adjacent the station corresponding to the wiper, moves 10 feet along its path. Consequently, the initiation of transfer mechanism movement into its transfer position in the path of an adjacent carrier can be arbitrarily selected at any one of twenty positions of the carrier 6 inches apart by selecting any one of the twenty contacts accessible to a wiper 10 and connecting that contact to the corresponding station control circuit.

In a practical arrangement however, there are very short periods of time during which contact sets 16 and brush sets 17 are not in engagement—i.e. as contact sets 16 advance to the next succeeding brush sets 17. During these time periods, transfer functions cannot be initiated. Therefore, contacts in sets 11 engaged by wipers 10 during these time periods cannot be used.

Since positions 6 inches apart can be selected, it can be seen that the initiation of a transfer function can be effected within three inches of an arbitrarily selected vertical position at each station; however, each arbitrarily selected position must be within a distance equal to the spacing between carriers.

In a typical installation there is normally a 2 second time delay between the initiation of a transfer function and the actual positioning of the transfer mechanism in the path of an approaching carrier. Due to differences in the operation of various transfer mechanisms, the transfer insertion time may be retarded by as much as 20 percent. Therefore, insertion time may vary from 2 to 2⅖ seconds.

In the typical installation described, it would be preferable to initiate a transfer operation when an approaching carrier is about 5 feet from the arbitrarily selected transfer position. To accomplish this, the contact of a set 11, corresponding to an arbitrarily selected transfer position at a station, is determined; and the tenth contact ahead of the above said contact is connected to the respective control circuit for initiating transfer operations. This is repeated for each station.

With conveyor speed at the rate of 100 feet per minute, there will be a 3 second time interval between initiation of a transfer function and the arrival of the carrier at the transfer point. This 3 second interval insures positioning of each transfer mechanism in its transfer position before arrival of the approaching carrier.

Thus the commutator and slip ring section 14 of the memory drum assembly 12 provides a rough synchronization between the conveyor 1 and the control equipment, and switch 9 provides a very fine syncronization between the conveyor 1 and the control equipment.

The provision of the synchronizing switch 9 described above permits appreciable flexibility in equipment design.

The memory drum assembly 12 once manufactured for a particular installation cannot be changed easily with respect to synchronizing the engagement of contact sets 16 and stator brush sets 17. Consequently, without the provision of synchronizing switch 9 it would not be feasible to make changes in the arbitrarily selected transfer positions at the various stations. However, by the provision of synchronizing switch 9, the arbitrarily selected transfer positions at each station can be changed merely by connecting a different switch contact, corresponding to the new desired transfer position, to the associated control circuit.

A brief description will be made of a typical transfer mechanism for use at each station of the system shown in Fig. 1. The transfer mechanism is shown diagrammatically in Fig. 2. The transfer mechanism 8 includes a housing 201. A platform 202 is secured in any conventional manner, for example, by a tongue and groove assembly to the upper end of housing 201 for reciprocable movement as shown by the broken line adjacent thereto. The broken line indicates the position that platform 202 would assume when extended into the path of an approaching carrier to perform a transfer function. The lower edge 203 of platform 202 is transversely grooved. A pinion 204 meshes with the grooved edge 203 to form a rack and pinion assembly.

The right hand half of platform 202 is conventional in structure, comprising a plurality of spaced parallel bars which pass through a complementary group of spaced parallel bars which form the base of conventional carriers 4.

A conventional single phase capacitor starting motor 205 operates the rack and pinion assembly through a speed reducing device 206. The motor 205 can be operated in either direction by reversing the connection of the input leads 207 and 208 to the A.C. source. When the motor 205 is rotated in one direction, the platform 202 is extended into the path of the conveyor carriers; and, when the motor 205 is rotated in the opposite direction, the platform 202 is retracted to its normal position.

An electrical tray detecting switch 209 is suitably mounted on the housing 201 to detect the presence or absence of a tray 210, a plurality of which are provided for holding objects to be transported by the conveyor. The switch 209 is shown in its operated position. An actuator element 211 extending through an aperture (not shown) in platform 202 is depressed by tray 210 from a position slightly above the upper surface of platform 202 to a position coincident with the upper surface of platform 202 to actuate switch 209.

A platform position detecting switch 212 suitably mounted on housing 201 is held in operated position by a projection 213 on platform 202 when platform 202 is in its normal retracted position. When platform 202 begins to move toward its transfer position in the carrier path, projection 213 disengages switch 212; and switch 212 restores to its normal position. When platform 202 reaches the extended transfer position, projection 213 actuates an extended position limit switch 214.

Although all objects transported by the conveyor will be placed in trays such as 10, the description will merely refer to the objects being transported without mention of the trays. The use of uniform trays such as 10 permits the transportation of objects of various sizes and configurations.

As is well known in the art, the transfer mechanisms at discharge stations have associated therewith equipment (not shown) to automatically move objects from the transfer mechanism platform to an adjacent storage rack as soon as the platform retracts to its normal position.

*Load station circuits—Neon tube storage*

A detailed description of the control circuits for the typical load stations will now be made with particular reference to the embodiment utilizing neon tubes for storing routing information. Fig. 3 shows a neon tube group 301 of storage section 34 corresponding to one of the carriers 4. Storage section 34 includes a similar tube group for each carrier 4. Fig. 3 also shows the control circuit 31 of load station 5, selector 30 of load station 5, and the motor control circuits 300 for the transfer mechanism 8 of load station 5. A set of drum contacts 16 corresponding to the tube group 301 are electrically connected to the cathodes of the respective tubes.

It is assumed that the carrier corresponding to tube group 301 is approaching station 5 and that the stator brush set 17 corresponding to load station 5 has just engaged contact set 16 to connect tube group 301 to control circuit 31.

For simplicity of description, several relay and switch contacts have been shown in detached form—a short vertical line intersecting a conductor representative of contacts which are normally open and an "X" intersecting a conductor indicating normally closed contacts. The detached relay contacts will bear reference numerals corresponding to the reference numerals of their respective relays with the addition of letter subscripts.

The neon tubes in group 301 may be any type commonly used in computer applications, such as General Electric NE 96 tubes which fire with a plate to cathode voltage greater than 130 volts and which thereafter maintain conduction until the plate to cathode voltage is somewhat less than 70 volts. When conducting in the circuits shown, the neon tubes will tend to maintain a positive 30 volt potential at their cathodes.

In some instances for ease of description, the phrase "writing information into a neon tube group" will be used to identify the operation comprising the connection of a negative battery firing potential to the cathodes of certain neon tubes in a tube group to register therein a code permutation characterized by the conducting condition of said certain tubes.

Also the term "erase" will be used to identify the operation of connecting a positive battery cutoff potential to conducting tubes in a group to cause them to cease conducting.

Following common practise in the art, the words "code" and "code permutation" will be used in a synonymous sense.

A positive 100 volt supply is connected across stator brushes 302 and 303 (corresponding to brushes 48 and 49, Fig. 1) and slip rings 304 and 305 (corresponding to 18 and 19 of Fig. 1) to neon tubes 306–1 to 306–7 of group 301 through resistances 307–1 to 307–7 in cathode circuits of tubes 306–1 to 306–7, respectively. Contacts 308–1 to 308–7 of set 16 are connected directly to the cathodes of tubes 306–1 to 306–7, respectively.

When the carrier corresponding to neon tube group 301 is empty, all tubes will be nonconducting. When the corresponding carrier is loaded, a predetermined three of the seven tubes group 301 assigned to a predetermined discharge station will be caused to conduct. Using three out of seven tubes for destination codes provides for a capacity of up to 35 discharge stations. It will be understood that the number of tubes used in any definite installation will depend upon the number of discharge stations used.

A relay 309 is provided in control circuit 31 to detect the full or empty condition of carriers approaching load station 5. As a carrier approaches station 5, corresponding contacts 16 engage brushes 314–1 to 314–7 corresponding to station 5.

Assuming, as indicated above, that the carrier corresponding to tube group 301 is approaching station 5, relay 309 will be connected to the cathodes of tubes 306–1 to 306–7 by way of branch circuits including diode 310, conductors 311 and 312, diodes 313–1 to 313–7, stator brushes 314–1 to 314–7 and contacts 308–1 to 308–7. If none of the tubes 306–1 to 306–7 are conducting due to the carrier being empty, the normally energized relay 309 remains energized over a circuit extending from the positive terminal of a 100 volt supply through resistance 315, conductor 316, relay 309, diode 310, conductors 311 and 317 and resistance 318 to a negative 100 volt battery supply. In this instance with no neon tube conducting, conductor 311 is slightly above ground potential because diode 350 is conducting and there is only a small potential drop across diode 350. The circuit for diode 350 extends from negative battery connection through resistance 318 and diode 350 to ground.

However, when any one of the tubes 306–1 to 306–7 is conducting, a positive 30 volt potential at its cathode is extended through the above described relay 309 operating circuit to conductor 311. With a positive 30 volt potential at conductor 311, diode 350 will no longer conduct. Resistance 351 is of such value relative to resistance 315 as to result in a 30 volt drop across itself. Consequently, a positive 30 volt potential appears at both ends of relay 309 causing it to restore.

Thus, relay 309 can detect the loaded or empty condition of an approaching carrier. If the approaching carrier is empty, relay 309 remains energized; and, if the carrier is loaded, three of its corresponding tubes 306–1 to 306–7 will be conducting to cause relay 309 to be deenergized as described above.

The discharge station selector 30 includes a manually operable pushbutton, such as 319, for each discharge station, including, if desired, one for monitor station 7. Associated with each pushbutton is a relay, such as relay 320, which is energized when the pushbutton is depressed. For example, pushbutton 319 completes a circuit from ground over conductor 321, contacts 322, and conductor 323 and relay 320 to battery.

Spring biased contacts 322 will return pushbutton 319 to its normal position, and relay 320 is held operated over a circuit extending from battery through relay 320, conductor 323, contacts 320d, conductor 325, contacts 327, conductor 328, contacts 329, conductor 330 and contacts 331 to ground.

Contacts 327 and 329 in the holding circuit of relay 320 and all other corresponding relays associated with pushbuttons assigned to different discharge stations provide for restoration of erroneously selected pushbuttons. For example, assume pushbutton 319 had been selected erroneously instead of pushbutton 319–1. Before transfer of the waiting object to a carrier is made, pushbutton 319–1 is depressed; and contacts 327 will open to restore relay 320. At the same time relay 320–1 is energized and held energized over circuits similar to those described for relay 320.

Relay 320, when energized, closes contacts 320a, 320b and 320c which prepare a circuit for writing into the memory drum assembly 12 coded information assigned to the discharge station corresponding to pushbutton 319. Each of the relays in selector 30 similar to relay 320 similarly prepare circuits for writing into a memory drum assembly 12 coded information corresponding to their respective discharge stations.

A release relay 332 is provided in selector 30 for opening contacts 331 in the holding circuits of each of the relays such as relay 320 to release such relays at the beginning of a transfer operation. More specifically, relay 332 is energized by contacts 333 which are closed when the transfer mechanism 8 at load station 5 moves from its normal retracted position toward an extended position in the path of an approaching carrier.

Relay 334 in selector 30 is energized when any one of the pushbuttons are depressed. For example, when pushbutton 319 is depressed relay 334 is energized over a circuit extending from battery through relay 334, conductor 335, contacts 336 which make before contacts 329 break, and contacts 329 and 331 to ground. As soon as relay 334 energizes over the above described circuit, it closes contacts 334a to maintain itself operated over a circuit extended from battery through relay 334, conductor 337, contacts 334a, conductor 338 and contacts 331 to ground. When relay 334 energizes, it closes contacts 334b to prepare a circuit for energizing relay 339.

Thus it can be seen that when one of the push buttons such as 319 is depressed, relay 334 will prepare a circuit for relay 339, and one of the relays such as 320 will prepare a circuit for writing a predetermined code into the information storage section 34.

Relay 339 controls the initiation of a loading operation. Contacts 340 further prepare the energizing circuit of relay 339 when they are closed responsive to a load transporting tray being placed upon the transfer mechanism 8 of load station 5. Contacts 309a of the empty carrier detecting relay 309 are closed when relay 309 is energized to further prepare the relay 339.

Thus, it can be seen that the operating circuit for relay 339 is prepared for operation when three conditions are fulfilled:

(1) a tray is placed on transfer mechanism 8 to close contacts 340,
(2) the discharge station selector 30 is operated to cause contacts 334b to close and
(3) the relay 309 detects the empty condition of an approaching carrier and closes contacts 309a.

When the approaching carrier reaches a predetermined position relative to the load station 5, the synchronizing switch 9 will complete an obvious circuit for momentarily energizing a synchronizing relay 341. Relay 341 closes contacts 341a to momentarily operate the relay 339 over an obvious circuit. As indicated above, the operation of relay 339 will begin the sequence of operations for transferring an object from the transfer mechanism 8 to the approaching carrier.

Relay 339 closes contacts 339a to operate the motor start relay 342 which locks itself operated over an obvious circuit including contacts 344 of an extended position switch similar to switch 214 (Fig. 2). The motor start relay 342 closes contacts 342a and 342b to start a motor 343 of the transfer mechanism 8. The motor 343 moves the platform of the transfer mechanism 8 to its extended position in the path of the approaching carrier. When the platform reaches its extended position, the extended position switch opens contacts 344 to restore the motor start relay 342. Contacts 342a and 342b will open to stop the motor 343. The transfer mechanism 8 will remain in this position until the approaching carrier removes the object from its platform.

When the motor start relay 342 starts the motor 343 in the manner described above, it also closes contacts 342c to apply a negative 100-volt potential through the code contact set such as contact set 320a, 320b and 320c prepared by the operation of the discharge station selector 30 to a predetermined three of the neon tubes in group 301. For example, negative battery potential will be extended through the contacts 345 of a retracted position switch similar to switch 212 (Fig. 2), contacts 342c, resistance 346, contacts 320a, 320b, and 320c, brushes 314–1, 314–2 and 314–3, contacts 308–1, 308–2 and 308–3 to the cathodes of the neon tubes 306–1, 306–2 and 306–3. Negative potential at the cathodes of neon tubes 306–1, 306–2 and 306–3 will cause them to conduct. As indicated above, once the tubes start to conduct, they will continue to conduct until their plate to cathode voltage is reduced to below 70 volts by a shunting circuit.

Shortly after, relay 342 closes contacts 342c, the contacts 345 will be opened consequent to the movement of the platform of the transfer mechanism 8 from its normal retracted position toward its extended position.

As soon as the approaching carrier removes the object from the platform of the transfer mechanism 8, a tray detecting switch similar to switch 209 (Fig. 2) closes contacts 347 in the operating circuit of the motor start relay 348. The contacts 347 are closed when there is no tray on the transfer mechanism 8 and are opened whenever a tray is placed on the mechanism. When the platform of the transfer mechanism 8 previously moved from its normal retracted position toward its extended position, a retracted position switch, similar to switch 212 (Fig. 2) closes contacts 349 in the operating circuit of the motor start relay 348. Consequently, when removal of the object from the transfer mechanism platform causes closure of contacts 347, as described above, the motor start relay 348 will be operated over an obvious circuit.

Relay 348 will close contacts 348a and 348b to energize the motor 343. Motor 343 will move the platform of the transfer mechanism 8 to its normal retracted position. In the retracted position of the platform, contacts 349 will open to restore the motor start relay 348. Contacts 348a and 348b will open to stop the motor 343.

The transfer mechanism 8 also includes a switch 360 for preventing double loading of carriers in the event of malfunctioning equipment. The switch 360 may be secured to the platform of the transfer mechanism 8 so that, in the extended position of the platform, it can mechanically detect a full approaching carrier. If it detects a full carrier, it opens the drive means of the conveyor 1 to stop the conveyor.

*Discharge station 6 circuits—neon tube storage*

A detailed description of the control circuits for the typical discharge station 6 will now be made with particular reference to the embodiment utilizing neon tubes for storing routing information. Figure 4 shows in detail the control circuit 32 associated with discharge station 6 and the motor control circuits 401 for the transfer mechanism 8a located at discharge station 6.

The brush set 17 connected to control circuit 32 engages the respective contact sets 16 as their corresponding carriers 4 move adjacent to discharge station 6. Consequently, when the carrier corresponding to neon tube group 301 is adjacent discharge station 6, the stator brushes 402–1 to 402–7 of the brush set 17 engage contacts 308–1 to 308–7 (Fig. 3) connected to neon tube group 301.

The control circuit 32 (Fig. 4) will detect a code permutation characterized by neon tubes 306–1, 306–2 and 306–3 conducting and tubes 306–4 to 306–7 nonconducting. Control circuit 32 includes a code detecting relay 403 which is normally deenergized due to shunting contacts 404a of a synchronizing relay 404. Synchronizing relay 404 is energized each time a carrier passes a predetermined position at discharge station 6. When relay 404 is energized contacts 404a open to remove the shunt from the assigned code detecting relay 403. If one or more of the neon tubes connected to control circuit 32 by way of brushes 402–1, 402–2 or 402–3 is nonconducting, indicating a nonassigned code ground potential from the cathode of the nonconducting neon tube will be extended through the respective diode 405–1, 405–2, or 405–3 to conductor 406 to cause both sides of relay 403 to be grounded, whereby relay 403 remains deenergized.

However, if all three neon tubes connected to brushes 402–1, 402–2 and 402–3 are conducting, indicating the presence of the assigned code the positive 30-volt potential at their cathodes will be extended over the above described circuit to conductor 406 and the code detecting relay 403 will operate. The operating circuit for relay 403 extends from ground through conductor 407, relay 403, conductor 408 and closed contacts 409a of an erase relay 409 to conductor 406 which has a positive 30-volt potential applied thereto.

Thus, it can be seen that, during the momentary operation of the synchronizing relay 404, the code detecting relay 403 will be energized if its assigned code is detected and will remain deenergized if a code other than its assigned code is detected.

When relay 403 is energized, it closes contacts 403a in the operating circuit of a motor-starting relay 410. A conventional vacancy limit switch (not shown) controls normally closed contacts 411 in the operating circuit of the motor-start relay 410. When the discharge station 6 has room to accept one or more additional objects from the conveyor 1, the vacancy switch maintains contacts 411 closed. When the discharge station 6 is full and cannot receive additional objects from the conveyor 1 until a station attendant removes objects therefrom, the vacancy switch causes contacts 411 to open.

Consequently, if the discharge station 6 is not full, then the energization of relay 403 will cause contacts 403a to complete the obvious circuit for energizing relay 410 which electrically maintains itself operated over an obvious circuit, including contacts 412 of an extended position limit switch similar to switch 214 (Fig. 2).

Energization of relay 410 closes contacts 410a and 410b to cause a motor 413 to move the platform (not shown) of transfer mechanism 8a to its extended position in the path of the approaching carrier. When platform reaches its extended position, the limit switch 214 is operated to open contacts 412 in the holding circuit of relay 410. Relay 410 restores to stop motor 214. The platform of the transfer mechanism 8a is now in position to unload an object from the carrier approaching discharge station 6.

At the same time that relay 403 closes contacts 403a to cause positioning of the transfer mechanism 8a, it also closes contacts 403b to energize the erase relay 409 over an obvious circuit. The contacts 421 in the circuit for relay 409 are normally closed whenever the corresponding storage rack at the discharge station 6 has sufficient space to receive at least one more object. The contacts 421 open only when the storage rack is full.

Relay 409 closes contacts 409c to extend positive battery potential from conductor 414 to the cathodes of the three neon tubes connected to brushes 402–1, 402–2 and 402–3 by way of diodes 405–1, 405–2, 405–3, respectively. With positive potential applied to their cathodes, the three neon tubes no longer conduct.

The erase relay 409 also opens contacts 409b which removes negative battery potential from conductor 415. Prior to the opening of contacts 409b, the negative battery potential connected to conductor 415 was connected through resistances 416–1 to 416–7 to the cathodes of the seven neon tubes connected to brushes 402–1 to 402–7 to prevent neon tubes which are conducting when first engaged by the brushes from ceasing to conduct. If negative battery potential were not so connected, the positive battery potential connected to the conductor 414 and extended through the resistance network of the control circuit 32 to the cathodes of the four neon tubes connected to brushes 402–4 to 402–7 would erase code information stored therein.

This would cause erasure of code permutations other than that assigned to discharge station 6.

When the negative battery potential is removed from conductor 415 as described above, positive battery potential at 414 is also extended through conductors 417–4, 417–5, 417–6 and 417–7 to the cathodes of the neon tubes connected to brushes 402–4, 402–5, 402–6 and 402–7, respectively, to cause said tubes to cease conducting in the event that one or more was conducting due to malfunctioning of the control equipment.

With the platform of the transfer mechanism 8a in its extended position, as described above, the object on the approaching carrier 4 will be deposited on the platform. When the object is so deposited, a tray detecting switch (not shown) similar to switch 209 of Fig. 2 will close contacts 418 to energize a second motor-start relay 419 over an obvious circuit including contacts 420 of a platform position sensing switch similar to switch 212 of Fig. 2.

The contacts 420 are held open when the platform of transfer mechanism 8a is in its normal retracted position, and contacts 420 are held closed in all other positions of the platform. Since the platform is in extended position, contacts 420 are closed when contacts 418 are closed as described above.

When relay 419 is so energized, it closes contacts 419a and 419b to operate motor 413 in an opposite direction to move the platform to its normal retracted position. With the platform in its normal position, contacts 420 open to restore relay 419. Contacts 419a and 419b open to stop the motor 413. The object on the platform moves to an associated storage rack in a manner described previously, and the tray sensing switch opens contacts 418.

*Routing an object from the load station 5 to discharge station 6 neon tube storage*

The routing of an object from the load station 5 to the discharge station 6 will now be described.

The push button 319 of the selector 30, which selects the discharge station 6, is actuated to operate relay 320 and relay 334. Relay 320 prepares the code writing circuits in control circuit 31 and relay 334 prepares a circuit for a transfer initiating relay 339.

The object is placed upon the transfer mechanism 8 and the tray detecting switch further prepares the circuit for relay 339. When the next empty carrier, for example, the carrier corresponding to tube group 301, approaches the load station 5, relay 309 operates to further prepare a circuit for relay 339. When the carrier reaches a predetermined position, the synchronizing switch 9 operates the synchronizing relay 341 which in turn operates relay 339.

Relay 339 causes the code permutation assigned to the discharge station 6 to be written into the neon tube group 301. Relay 339 also operates the motor start relay 342 which in turn operates the motor 343 to extend the platform of the transfer mechanism 8 into the path of the approaching carrier.

The approaching carrier removes the object from the platform and the motor start relay 348 is operated to cause the motor 343 to return the platform of the transfer mechanism 8 to its normal retracted position.

The carrier moves along its path toward the discharge station 6. Simultaneously, the memory drum assembly 12 rotates contacts 308-1 to 308-7 of the neon tube group 301 toward the stator brushes 402-1 to 402-7 associated with the discharge station 6.

As the carrier approaches the discharge station 6, the contacts 308-1 to 308-7 engage the brushes 402-1 to 402-7.

When the carrier reaches a predetermined position relative to the discharge station 6, the synchronizing switch 9 operates the synchronizing relay 404 which removes a shunt from the assigned code detecting relay 403. The relay 403 operates in response to detecting the assigned code permutation in the tube group 301.

Relay 403 operates the motor start relay 410 which in turn causes the motor 413 to move the platform of the transfer mechanism 8a into the path of the approaching carrier. Relay 403 also operates the erase relay 409 which causes the erasure of the assigned code permutation in the neon tube group 301.

When the carrier deposits the object on the platform of the transfer mechanism 8a, the motor start relay 419 is operated to cause the motor 413 to return the platform to its normal retracted position. The object then moves to an adjacent storage rack.

*Monitor station 7 circuits—Neon Tube storage*

A detailed description of the operation of the monitor station 7 circuits, Fig. 5, shows in detail the control circuit 33 and the motor circuits 501 associated with the transfer mechanism 8b of monitor station 7.

The control circuit 33 as shown is arranged to detect a code in passing neon tube groups, such as 301 (Fig. 3), characterized by conduction in tubes corresponding in position to tubes 306-1, 306-2 and 306-4 of tube group 301. It will be understood however that in differing installations the monitor station 7 may be assigned several codes or no code at all.

Before control circuit 33 attempts to detect its assigned code, it first senses the conducting or nonconducting states of the neon tubes of each neon tube group connected thereto as its corresponding carrier passes the discharge station 7 to determine whether or not less than three of the seven tubes in a group being sampled are conducting due to malfunctioning of the control equipment.

More specifically, the monitor station 7 has associated therewith a conventional photosensitive device, for example, a Clarex CL2, photocell 502 and a source of light 503 focused on a photocell 502. The light source 503 and photocell 502 are positioned such that, when a full carrier passes a predetermined position at the monitor station 7, the path of the light between the photocell 502 and the source 503 will be interrupted. The object held on the full carrier is used to interrupt the light rays.

The output of photocell 502 is fed to the control grid of a conventional amplifier 504. The amplifier 504 normally conducts to cause the operation of a load detecting relay 505. However, when light from the source 503 falls on the photocell 502, the output of the photocell drives the control grid of the amplifier 504 negative below cutoff. The amplifier no longer conducts and relay 505 is restored.

When the object on a loaded carrier interrupts the light from source 503, the output of the photocell is reduced; and the amplifier again conducts to operate relay 505.

Thus it can be seen that relay 505 operates only when a full carrier approaches the monitor station 7. The load detecting relay 505 initiates the detection of improperly marked neon tube groups, i.e. less than three tubes conducting.

More specifically, relay 505 opens contacts 505b to prevent premature erasure of a code stored in a connected neon tube group. Relay 505 also closes contacts 505a to momentarily operate relay 506. Relay 506 closes contacts 506a to complete a circuit from ground through conductor 507, contacts 506a, contacts 508a of a code erase relay 508, contacts 509a of a monitor erase relay 509 and voltage divider resistances 510 and 511 to positive battery connected to conductor 512. Thus, resistances 510 and 511 form a voltage dividing network from ground to positive battery potential whenever relay 506 closes contacts 506a.

The neon tube groups, such as group 301 (Fig. 3) form parallel voltage dividing networks between ground and positive battery potential. In each neon tube circuit a ground potential will appear at the cathode of the neon tube while the tube is nonconducting, and a positive 30-volt potential will appear at the cathode if the tube is conducting. As each neon tube group is connected to the monitor control circuit 33 of Fig. 5 the cathodes of the tubes are connected in circuit with the voltage divider network comprising resistances 510 and 511.

More specifically, the cathode resistances 307-1 to 307-7 are connected in series with resistances 518-1 to 518-7 by way of contacts 308-1 to 308-7, brushes 516-1, to 516-7 and diodes 517-1 to 517-7. Each cathode resistance and its series connected corresponding resistance 518 is connected in parallel with a resistance 513 by way of conductor 519. The resistance 513 is connected across the voltage divider resistance 510 with two terminals of the resistances 510 and 513 connected together at ground potential and with the other two terminals 561 and 562 being connected through a diode 14 and a false code detecting relay 515.

Thus, it can be seen that parallel voltage dividing circuits are provided by resistances 510 and 511 and the parallel neon tube circuits. It can further be seen that the diode 514 and the false detecting relay 515 provide a bridge circuit connection between the terminal 561 between resistances 510 and 511 and the terminal 562 which is connected to the cathodes of the neon tubes connected to control circuit 33 by way of series resistances 518–1 to 518–7.

The resistances 510, 511, 513, 518–1 to 518–7, and the resistances (similar to resistances 307–1 to 307–7 of Fig. 3) connected in the cathode circuits of (each neon tube group have their relative values adjusted such that the voltage drop across resistance 513 and the circuits paralleled therewith is greater than the voltage drop resistance 510 when three or more neon tubes are conducting. With a voltage drop across 513 greater than the voltage drop across resistance 510, relay 515 will be operated.

Thus, it can be seen that if a carrier approaching the monitor station 7 is full and if a detectable code (at least 3 conducting tubes) is stored in the neon tube group corresponding to the approaching carrier, the false code detecting relay 515 will be operated.

However, in the event that malfunctioning of the equipment has caused less than three neon tubes in a group to conduct, then the voltage drop across resistance 513 will be less than the voltage drop across resistance 510 when the tube group is connected to brushes 516–1 to 516–7. With the voltage drop across resistance 510 being greater than that across resistance 513, the blocking diode 514 will prevent current flow and relay 515 will not operate.

Assume that a full carrier with its corresponding tube group properly marked approaches the monitor station 7.

When relay 515 is operated, in the manner described above, it closes contacts 515a. With contacts 515a closed, the monitor control circuit 33 is now arranged in a manner similar to the typical discharge control station 32; and, therefore, the monitor control circuit 33 is ready to detect the presence or absence of its assigned code in the neon tube group connected therewith.

When the synchronizing switch 9 energizes the synchronizing relay 520 shortly after the operation of relay 515, contacts 520a are opened to remove the shunt from the code detecting relay 521. The code detecting relay 521 is similar to the code detecting relay 403 (Fig. 3) of control circuit 32 and functions in a similar manner to detect a code characterized by the conduction of neon tubes in the tube group connected thereto, corresponding in position to tubes 306–1, 306–2 and 306–4 of tube group 301. If the tubes corresponding in position to tubes 306–1, 306–2 and 306–4 are conducting, the positive 30-volt potential at their cathodes will be extended by way of brushes 516–1, 516–2 and 516–4 and diodes 522–1, 522–2, 522–4 and contacts 515a to conductor 523. With a positive 30-volt potential at conductor 523, the code detecting relay 521 will operate over a circuit extending from ground at conductor 507 through contacts 506–a, contacts 508–a, diode 524 and relay 521 to the positive 30-volt potential at conductor 523.

In the event that any one or more of the neon tubes connected to brushes 516–1, 516–2 and 516–4 is nonconducting, ground potential at its cathode will be extended to conductor 523 to place a shunt across relay 521 to prevent its operation.

When relay 521 operates as described above in response to the detection of the assigned code, it closes contacts 521a in the operating circuit of the motor start relay 525. If the monitor station 7 has room to accept the object on the approaching carrier, the vacancy limit switch contacts 526 will be closed, and closure contacts 521a will operate the motor start relay 525 over an obvious circuit. The motor start relay 525 closes contacts 525a to hold itself operated over an obvious circuit including the normally closed contacts 527 of an extended position switch similar to switch 214 of Fig. 2.

Also, relay 525 closes contacts 525b and 525c to cause the motor 528 to move the platform of a transfer mechanism 8b to its extended position in the path of the approaching carrier. When the platform reaches its extended position, contacts 527 open to restore relay 525. Relay 525 opens contacts 525b and 525c to stop the motor 528.

When the assigned code detecting relay 521 operates as described above to operate the motor start relay 525, it also closes contacts 521b to complete an obvious circuit for operating the monitor erase relay 509. Relay 509 opens contacts 509a which causes relay 515 to restore.

Relay 509 further opens contacts 509b to remove negative potential from the brushes 516–3, 516–5, 516–6 and 516–7, whereby positive potential on conductor 512 is extended through the resistances 540–3, 540–5, 540–6 and 540–7 to the cathodes of the neon tubes respectively connected thereto to erase any information stored therein.

At about the time that relay 509 operates, the motor start relay 525 closes contacts 525d to operate the code erase relay 508 over an obvious circuit. Relay opens contacts 508a to restore the assigned code detecting relay 521. Relay 508 also closes contacts 508b to extend positive battery potential from conductor 512 over contacts 508b, contacts 520d of the synchronous relay 520 which is still operated, conductor 541, diodes 522–1, 522–2 and 522–4 to the cathodes of the neon tubes connected therewith to erase the code stored therein. At the same time, relay 508 opens contacts 508c to remove negative battery potential from the conductor 542 which is normally connected through resistances 543–1, 543–2, and 543–4 to brushes 516–1, 516–2 and 516–4, respectively, to maintain conduction of conducting tubes connected thereto.

When the approaching carrier deposits its object on the platform of transfer mechanism 8b, contacts 529 of a tray detecting switch, similar to switch 209 of Fig. 2, will close to operate the motor start relay 530 over an obvious circuit including closed contacts 531 of a retracted position detecting switch, similar to switch 212 of Fig. 2. The contacts 531 are normally open in the retracted position of the platform of the transfer mechanism 8b, and are closed in all other positions of the platform.

Relay 530 closes 530a and 530b to cause the motor 528 to return the platform to its retracted position. When the platform reaches its retracted position, contacts 531 open to restore relay 530. Relay 530 opens contacts 530b and 530c to stop the motor 528. The object deposited on the platform of the transfer mechanism 8b will move in a manner described previously to a storage rack, whereupon the tray detecting contacts 529 will open.

Thus, the false code detecting relay 515 will operate if three or more neon tubes connected to brushes 516–1 to 516–7 are conducting, and subsequent thereto the assigned code detecting relay 521 will operate in the event of the detection of the assigned code to cause the transfer of an object from the conveyor 1 to the monitor station 7.

Assume now that a full carrier is approaching the monitor station 7 and that its corresponding neon tube group has an inadequate code stored therein—i.e. less than three neon tubes conducting.

The photosensitive device will operate the full carrier detecting relay 505 in the manner described above. Relay 505 operates relay 506. As described above, the false code detecting relay 515 will not operate consequent to the operation of relay 506 inasmuch as fewer than three neon tubes in the group corresponding to the approaching carrier are conducting.

With the false code detecting relay 515 deenergized and the loaned detecting relay 505 energized causing the energization of relay 506, a circuit is prepared for energizing the assigned code detecting relay 521 irrespective of the presence or absence of the code assigned to the monitor station 7.

Prior to the operation of the synchronizing relay 520 the conducting or non-conducting state of the neon tubes connected to the brushes 516-1, 516-2 and 516-4 is maintained unaffected by the negative battery potential connected thereto by way of resistances 543-1, 543-2 and 543-4 and the positive battery potential connected thereto by way of conductor 512, resistance 545, conductor 523, contacts 520c, conductor 541 and diodes 522-1, 522-2 and 522-4. However, when the synchronizing relay 520 is operated by the synchronizing switch 9 shortly after the operation of relays 505 and 506, it opens contacts 520c in the above described circuit for the positive battery potential. The negative battery potential is then applied through the above described branch circuits to the cathodes of the neon tubes connected to the assigned code detecting brushes 516-1, 516-2 and 516-4 to fire the tubes.

Thus, in the event that a faulty code is detected the code assigned to the monitor station 7 is written into the neon tube set.

Relay 520 also opens contacts 520a to remove a shunt from the assigned code detecting relay 521. Relay 520 also opens contacts 520c to disconnect the neon tubes connected to brushes 516-1, 516-2 and 516-4 from the circuit for relay 521. Relay 521 will now be operated over a circuit extending from ground through conductor 507, contacts 506a and 508a, diode 524, relay 521, resistance 545 and conductor 512 to positive battery potential.

The operation of the assigned code detecting relay 521 initiates an unloading operation in a manner similar to that described above with respect to an unloading operation initiated consequent to the detection of the code assigned to the discharge station 7. Therefore, the unloading operation will be described only briefly.

Relay 521 operates the motor start relay 525 in the event that there is room to accept an additional object at the monitor station 7. Relay 525 operates the motor 528 to extend the platform of the transfer mechanism 8b into the path of the approaching carrier. The object on the carrier is deposited on the platform and the start relay 530 operates to cause the motor 528 to return the platform to its normal retracted position.

When relay 521 initiates the unloading operation as described above, it also closes contacts 521b to operate relay 509. Relay 509 opens contacts 509b to remove the negative battery holding potential from the brushes 516-3, 516-5, 516-6 and 516-7. Positive battery erase potential at conductor 512 is extended to the brushes 516-3, 516-5, 516-6 and 516-7 to cut off conducting neon tubes connected thereto.

When the motor start relay 525 operates as described immediately above, it opens contacts 508c to remove the negative battery holding potential from brushes 516-1, 516-2 and 516-4. Relay 525 also closes contacts 508b to extend the positive battery erasing potential from conductor 512 through contacts 508b, contacts 520d of the operated synchronizing relay 520, conductor 541, diodes 522-1, 522-2 and 522-4 to the cathodes of the neon tubes connected to the assigned code sensing brushes 516-1, 516-2 and 516-4. With positive battery potential at the cathodes of the neon tubes, conducting ones of the tubes will be cut off.

Thus it can be seen that, when a full carrier with a faulty code approaches the monitor station 7, the carrier will be unloaded and the faulty code erased if there is room to accept additional objects at the monitor station 7.

In the event that, when relay 521 is operated as described above consequent to the detection of the faulty code, there is no room to accept an additional object at the monitor station 7, a vacancy limit switch (not shown) will have previously opened contacts 526 to prevent the operation of the motor start relay 525. Thus, an unloading operation cannot be affected.

The monitor erase relay 509 is operated by contacts 521b of the assigned code detecting relay 521. Relay 509 opens contacts 509b to cut off conducting neon tubes connected to brushes 516-3, 516-5, 516-6 and 516-7 in the manner described above. Relay 520 writes the assigned monitor code into the tube group as described above. Relay 508 will not be operated inasmuch as the motor start relay 525 is not operated. Thus contacts 508b which normally provide erasure of the monitor code remain open. Thus, the monitor code is written into the tube group and the carrier will keep its load until there is available space at the monitor station 7.

When an empty carrier approaches the monitor station 7, the load detector relay 505 will not be operated by a photo sensitive device 502. Consequently, neither the false code detecting relay 515 nor the assigned code detecting relay 521 can be operated.

When the carrier reaches a predetermined position at the monitor station 7, the synchronizing switch 9 will operate the synchronizing relay 520. The relay 520 opens contacts 520b to remove the negative battery holding potential from the cathodes of the neon tube group corresponding to the approaching carrier.

It will be remembered that relay 505 is not operated; and, therefore, contacts 505c prevent the negative battery holding potential from being extended to the cathode over an alternate circuit in parallel with contacts 520b of a synchronizing relay 520.

With the negative battery holding potential removed from the cathode of the neon tubes, a positive battery erase potential is extended from the conductor 512 to the cathodes of the neon tubes connected to brushes 516-3, 516-5, 516-6, 516-7 in the manner described above to erase any coded information that might be stored in the neon tube due to malfunctioning of the equipment.

Relay 520 also closes contacts 520d to extend the positive battery erase potential from conductor 512 through contacts 505b of the deenergized load detecting relay 505, contacts 520b, conductor 541; diodes 522-1, 522-2 and 522-4 and brushes 516-1, 516-2 and 516-4 to the cathodes of the neon tubes connected to the brushes to erase any code information stored therein due to malfunctioning of the equipment.

Thus, it can be seen that, whenever an empty carrier approaches the monitor station 7, the control circuit 33 will cause the erasure of any code permutation erroneously marked in the neon tube group corresponding to the approaching carrier.

*Load station 5 circuits—ferrite core storage*

Figure 6:
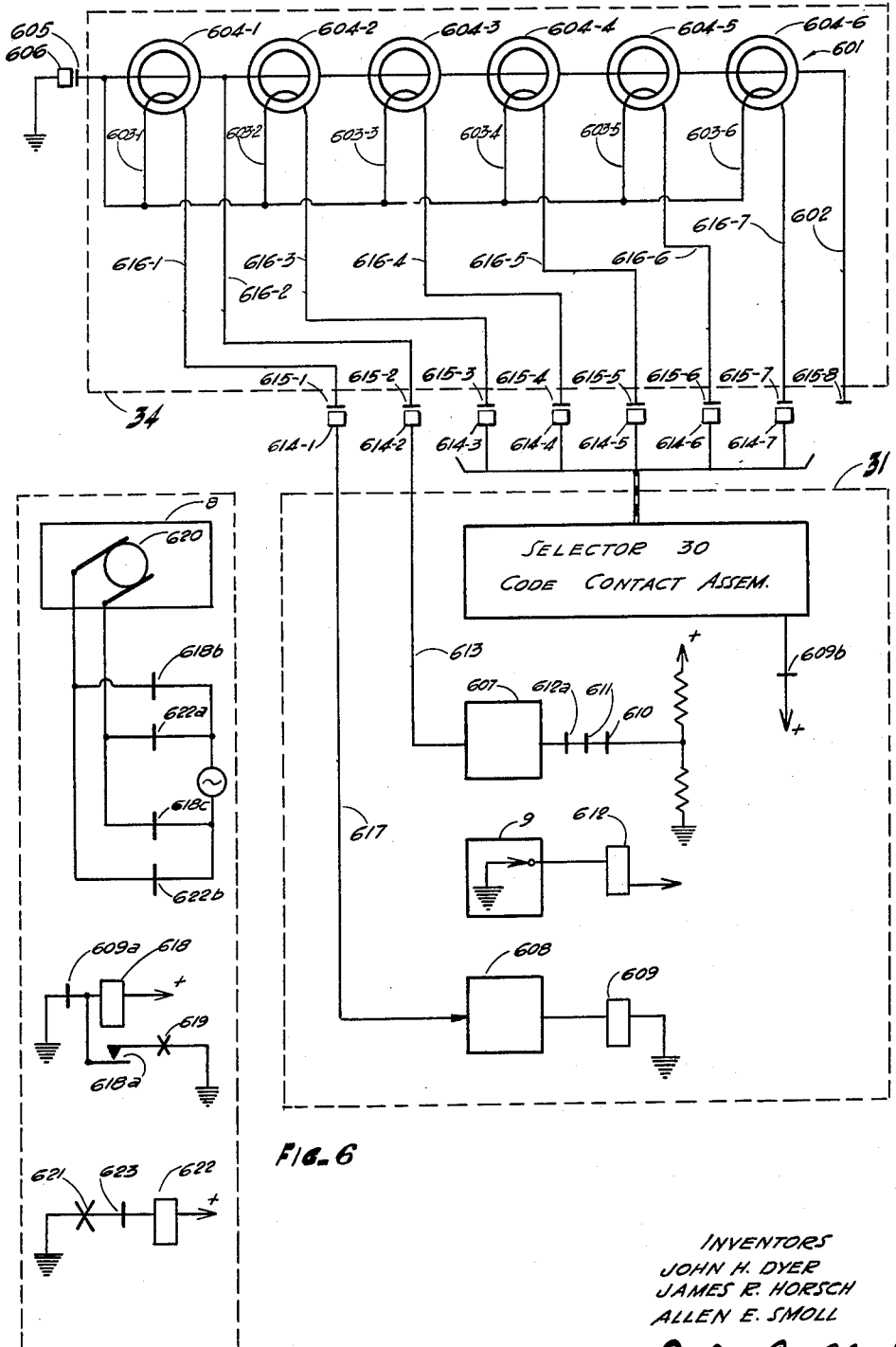

A detailed description of the control system for conveyor 1 utilizing ferrite cores for storing routing information will now be made. Figs. 6, 7 and 8 show the control circuits for the ferrite core embodiment.

It will be noted that the same system described above with respect to neon tube storage is contemplated with regard to mechanical details. It is only the control circuit details which differ.

Thus for the embodiment shown in Figs. 6–8, there will be provided the diagrammatically shown system of Fig. 1.

More particularly, the typical load station 5 (Fig. 1) has associated therewith a discharge station selector 30, a control circuit 31 and motor control circuits for the transfer mechanism 8 all shown in more detail in Fig. 6.

Also, the typical discharge station 6 has associated therewith a control circuit 32 and motor control circuits for the transfer mechanism 8b all shown in more detail in Fig. 7.

The monitor station 7 includes a control circuit 33 partially shown in detail in Fig. 8.

And the transfer mechanism of Fig. 2 is again used for the ferrite core embodiment.

A ferrite core group 601 (Fig. 6) of storage section 34 includes a common winding 602 and a plurality of individual windings 603–1 to 603–6 for the 6 ferrite cores 604–1 to 604–6. One terminal of each of the windings is connected to ground through slip ring 605 and stator brush 606, which correspond respectively to slip ring 18 and brush 48 of Fig. 1. Only one brush and slip ring are required in this embodiment.

A ferrite core set, such as set 601 is provided for each conveyor carrier 4. Ferrite core 604–1 and each ferrite core corresponding thereto in the other ferrite core sets is used for storing information indicative of the full or empty condition of the respective carrier, load monitor cores. Ferrite cores 604–2 to 604–6 as well as corresponding ferrite cores in the other sets are used for storing code permutations assigned to the various discharge stations, and will be identified as routing code cores. The common winding 602 is used for erasing code permutations subsequent to removal of objects from the carrier corresponding to ferrite core group 601.

Ferrite cores are well known and will be described only briefly. The cores such as core 604–1 are annular rings made of a non-permanent ferromagnetic material which can be circumferentially polarized in either of two directions by passing a current flowing in a predetermined direction through either of two coils. The current is preferably of sufficient strength to saturate the core.

In accordance with conventional usage today, polarization of the core in one direction will be referred to as marking a "0" in the core and polarization of the core in the other direction will be referred to as marking a "1" in the core.

Therefore, a typical identification of the polarized conditions of the cores 604–2 to 604–6 in group 601 will be the 5, channel binary code permutation 01010 indicating that the cores 604–2, 604–4 and 604–6 are polarized in one direction and cores 604–3 and 604–5 are polarized in the opposite direction. A 5 channel code is used by way of example only.

Core 604–1 will be marked "0" if the corresponding carrier is full and will be marked "1" if the carrier is empty.

The application of a current pulse to contact 615–2 marks a "0" in core 604–1. The application of a current pulse to contact 615–8 marks a "0" in all cores 604–1 to 604–6. The application of a current pulse to the contact 615–1, 615–3, 615–4, 615–5, 615–6 or 615–7 marks a "1" in core 604–1, 604–2, 604–3, 604–4, 604–5 or 604–6 respectively.

If a "1" is marked in a core, for example core 604–1, a pulse through winding 602 to mark a "0" in core 604–1 will cause a voltage to be generated in the winding 603–1 of the core 604–1. If the winding 603–1 is connected in a complete circuit, the voltage generated will cause a current pulse in the circuit.

The cores and circuits for all ferrite core sets similar to set 601 are similarly arranged.

The selector 30 (Fig. 6) is similar to selector 30 of Fig. 3, except that each relay such as 320 will close any predetermined number of 5 possible contacts in series with brushes 614–3 to 614–7. Thus any 5 channel code permutation can be selected. With 5 channels available, a maximum of 32 discharge stations can be used.

The transfer mechanism control circuits for the transfer mechanism 8 are similar to those shown in Fig. 3.

The control circuit 31 in this embodiment includes a thyratron blocking oscillator 607 and a multivibrator 608 which operate a relay 609 to initiate a loading operation consequent to the actuation of the selector 30, placement of an object on the transfer mechanism 8 and the detection of an approaching empty carrier.

More specifically, when an object is placed on the platform of the transfer mechanism 8, its tray detecting switch will close contacts 610 in the input circuit to the thyratron blocking oscillator 607. When the selector 30 is actuated to prepare a predetermined code permutation assigned to the desired discharge station to which the object is to be routed, it closes contacts 611 in the input circuit of the oscillator 607. Contacts 611 are similar to contacts 334a of Fig. 3, and are operated by a relay similar to relay 334 of Fig. 3.

A synchronizing relay 612 is operated by the synchronizing switch 9 when each carrier reaches a predetermined position at the load station 5. When relay 612 operates, it closes contacts 612a to complete an input circuit to blocking oscillator 607 which circuit was prepared as described above by closure of contacts 610 and 611.

Oscillator 607, shown diagrammatically, is a conventional circuit including a 5-element thyratron. The control grid of the thyratron is normally biased negative below cut-off to prevent conduction of the thyratron even while positive voltage is applied to the plate. The plate to cathode voltage is supplied from an A.C. source through a transformer, the secondary of which is connected in the plate circuit of the thyratron. During one-half cycle of the A.C. source, the plate will become positive with respect to the cathode.

When contacts 612A, 611 and 610 are closed, as described above, they apply a positive bias potential to the suppressor grid of the thyratron, and the thyratron will conduct when the A.C. source drives the plate positive with respect to the cathode.

The oscillator 607 also includes a typical RC circuit connected to the thyratron grid. The RC circuit is charged by the plate current of the thyratron when it fires, and it biases the grid sufficiently negative to prevent conduction of the thyratron for a time interval long enough to permit opening of contacts 612a. Contacts 612a remove the positive bias from the suppressor grid. Thus further conduction by the thyratron is prevented.

When the thyratron conducts, as described above, it will send a pulse over conductor 613, brush 614–2, contact 615–2, conductor 616–2 and winding 602 to ground through slip ring 605 and brush 606.

If its corresponding carrier 4 is empty, the ferrite core 604–1 is polarized in a direction such as to cause a pulse in the winding 603–1 in response to the pulse through winding 602. If the corresponding carrier is full, the ferrite core 604–1 is polarized such that a pulse through winding 602 will not cause a pulse in winding 603–1.

Thus it can be seen that when a carrier 4 approaching the load station 5 is empty and the oscillator 607 produces an output pulse, a pulse from the winding 603–1 will be extended to the multivibrator 608 by way of conductor 616–1, contact 615–1, brush 614–1 and conductor 617.

The multivibrator 608 is of any conventional type which can momentarily operate a relay 609 when an input pulse is applied thereto.

Thus, it can be seen that, when an object is placed on the transfer mechanism 8 at the load station 5 and a selector 30 is actuated to properly route the object, the relay 609 will be operated in the manner described above when the next empty carrier approaches station 5.

Relay 609 closes contacts 609a to complete an obvious circuit for operating the motor start relay 618. Relay 618 closes contacts 618a to lock itself operated over an obvious circuit, including normally closed contacts 619 of an extended position switch of the transfer mechanism 8. The motor start relay 618 closes contacts 618b and 618c to cause the motor 620 of the transfer mechanism 8 to advance the platform to its extended position in the path of the approaching carrier. When the platform reaches the extended position, contacts 619 of the extended position switch will open to restore relay 618.

Relay 618 opens contacts 618b and 618c to stop the motor 620.

At the same time that relay 609 operates the motor start relay 618, it also closes contacts 609b to extend positive battery potential through the code permutation circuits prepared by the actuated push button of selector 30, the stator brushes 614–3 to 614–7 and contacts 615–3 to 615–7, predetermined ones of the windings 603–2 to 603–6 and slip ring 605 to ground at brush 606 to register in core set 601 a code permutation assigned to a selected discharge station.

As soon as the empty carrier approaching the load station 5 picks up the object from the platform of the transfer mechanism 8, the tray-sensing switch of the transfer mechanism 8 closes contacts 621 to operate the motor start relay 622 over an obvious circuit including contacts 623 of a retracted position switch of the transfer mechanism 8. The contacts 621 are normally closed when there is no tray on the platform of the transfer mechanism 8 and are opened only when a tray is placed on the platform.

The contacts 623 are normally open when the platform of the transfer mechanism 8 is in its normal retracted position. As soon as platform moves a slight distance from its retracted position, the contacts 623 close and remain closed until the platform is again returned to its retracted position. Thus contacts 623 are closed when contacts 621 close as described above.

Relay 622 closes contacts 622a and 622b to energize the motor 620 in such manner as to cause the motor 620 to return the platform of the transfer mechanism 8 to its normal retracted position. In the retracted position of the platform, the retracted position contacts 623 open to restore relay 622. Relay 622 opens contacts 622a and 622b to stop the motor 620.

*Discharge station 6 circuits—ferrite core storage*

A detailed description of the control circuits associated with the typical discharge station 6. Reference is directed to Fig. 7 which shows the control circuit 32, its associated brush set 17 and the motor control circuits for the transfer mechanism 8a.

Briefly, the control circuit 32 comprises a ferrite core set 701 and appropriate detecting circuits arranged to detect the code permutation 01010, a blocking oscillator 702 for initiating interrogation of each ferrite core set similar to set 601 of the storage section 34 as its corresponding carrier passes discharge station 6, an oscillator 703 and relay 704 for initiating the operation of the motor control circuits of the transfer mechanism 8a subsequent to the detection of the assigned code and a second blocking oscillator 705 which operates the ferrite core set 701 in a manner such that codes, transferred thereto from the ferrite core sets of storage section 34 for detection, are erased in the event that the assigned code is detected and are transferred back to the respective core set in storage section 34 if a code other than that assigned to the discharge station 6 is detected.

More particularly, when a carrier approaches the discharge station 6, its respective ferrite core set of the storage section 34 is connected by way of its associated contacts on commutator and slip ring section 14 and the stator brushes 706–1 and 706–3 to 706–8 of the brush set 17 to the control circuit 32 of discharge station 6.

For ease of description, it will be assumed that contacts 615–1 and 615–3 to 615–8 of the ferrite core set 601 (Fig. 6) have engaged brushes 706–1 and 706–3 to 706–8 of the control circuit 32. The windings 707–1 to 707–6 of ferrite cores 708–1 to 708–6 are connected by way of the brushes 706–1 and 706–3 to 706–7, and contacts 615–1 and 615–3 to 615–7 to the windings 603–1 to 603–6 respectively of the ferrite core group 601.

Thus, it can be seen that, if the signals are produced in any one of the windings 603–1 to 603–6, of the ferrite core set 601 the pulse will be extended to the corresponding winding 707–1 to 707–6 of the ferrite core set 701. signals passing through windings 707–1 to 707–6 cause corresponding pulses in windings 709–1 to 709–6 of the ferrite core set 701. Pulses in the windings 707–1 to 707–6 polarize the respective ferrite cores 708–1 to 708–6 in such manner as to register 1's therein.

The operation of the blocking oscillator 702 initiates the transfer of code permutations from the ferrite core set 601 to the ferrite core set 701. The blocking oscillator 702 is identical to the blocking oscillator 607 described above and will be described only briefly. If the discharge station has room to accept an object, the contacts 710 will be closed. When the carrier corresponding to the ferrite core set 601 reaches a predetermined position relative to a discharge station 6, the synchronizing switch 9 completes an obvious circuit for operating the synchronizing relay 711. Relay 711 closes contacts 711a to place a positive bias on the suppressor grid of the thyratron of blocking oscillator 702. When the plate is driven positive with respect to the cathode during the proper half-cycle of the A.C. input to its plate circuit, the thyratron will fire momentarily, then cut itself off in a manner described with respect to the thyratron of the blocking oscillator 607. A pulse will be applied to the conductor 712 by the firing of the thyratron.

The pulse from the blocking oscillator 702 is extended over conductor 712, brush 706–8, contact 615–8 (Fig. 6) and the winding 602 common to the ferrite cores in set 601 to ground through slip ring 605 and brush 606. The pulse through common winding 602 generates pulses in each of the windings 603–1 to 603–6 in which "1's" are registered. Pulses in windings 603–1 to 603–6 cause corresponding pulses in windings 707–1 to 707–6 and 709–1 to 709–6 as described above.

As noted above, a "1" marked in the ferrite core 604–1 is representative of an empty condition of its associated carrier. A "0" marked in ferrite core 604–1 is representative of the full condition of its respective carrier 4. A combination of "1's" and "0's" marked in ferrite cores 604–2 to 604–6 represent a code assigned to a predetermined discharge station. When the corresponding carrier 4 is empty, ferrite cores 604–2 to 604–6 will have 0's registered therein.

Windings 709–1, 709–2, 709–3 and 709–6 are connected to parallel inputs of a conventional OR circuit 712. The winding 709–3 is extended by way of conductor 713 to one input lead of a conventional AND circuit 714. The windings 709–5 is extended by way of conductor 715 to a second input lead of the AND circuit 714.

The OR circuit 712 can be one of any number well-known in the art which produces a pulse in its output conductor 716 if any one of the windings connected to its input extend a pulse thereto. The AND circuit 714 can be any one of a number well-known in the art which produces a pulse in its output conductor 717 if signals are simultaneously applied to each and every input conductor connected thereto.

A complimentor gate 718 is provided for applying an output pulse to one input lead of the AND circuit 714 by way of conductor 719 only in the event that the OR circuit 712 does not produce a pulse at conductor 716 when the blocking oscillator 702 produces a pulse at conductor 712. More specifically, the output lead 716 of the OR circuit 712 is connected to the suppressor grid of a pentode utilized in the complimentor gate 718. The output conductor 712 of the blocking oscillator 702 is connected to the control grid of the pentode of the complimentor gate 718. The pentode is normally biased below cutoff, and therefore normally is nonconducting. When a positive pulse is produced by the blocking oscillator 702 at conductor 712, it drives the pentode grid positive, at which time the tube will tend to conduct. However, if the OR circuit produces a pulse at conductor 716, it drives the suppressor grid sufficiently negative to prevent conduction by the pentode even though the control grid is driven positive by a pulse from the blocking oscillator 702.

Thus, it can be seen that the complimentor gate 718 will produce a pulse at conductor 719 only if OR circuit 712 does not produce a pulse when the blocking oscillator 702 is fired.

As noted above, a signal will be produced in winding 709–1 consequent to the operation of the blocking oscillator 702 if the ferrite core 604–1 is marked with a "1" representative of an empty corresponding carrier. A pulse produced in winding 709–1 will cause the OR circuit 712 to produce an output pulse at conductor 716 to prevent a complimentor gate 718 from producing a pulse at conductor 719. Similarly, if a pulse is produced in any one of the windings 709–2, 709–4 or 709–6 due to a "1" being marked in any one of the ferrite cores 604–2, 604–4, or 604–6, the OR circuit 712 will prevent the complimentor gate 718 from producing a pulse at conductor 719.

Thus, the complimentor gate 718 will produce a pulse at 719 only if there is a zero marked in the ferrite core 604–1 indicating a full carrier and zeros marked in the code cores 604–2, 604–4 and 604–6 when blocking oscillator 702 extends a pulse to the common winding 602 of the ferrite core set 601.

The windings 709–3 and 709–5 will produce pulses which will be extended over conductors 713 and 715 to the AND circuit 719 only if the ferrite cores 604–3 and 604–5 have "1's" marked therein when the blocking oscillator 702 operates to extend a pulse through the common winding 602 of the ferrite core set 601 as described above.

As noted above, the AND circuit 714 will produce an output pulse at conductor 717 only if pulses are simultaneously applied to conductors 713, 715 and 719. Thus, it can be seen that the AND circuit 714 will produce an output pulse at conductor 717 only if the core 604–1 is marked with a zero representative of a full carrier 4 and the ferrite cores 604–2 to 604–6 have the code permutation 01010 marked therein.

A second complimentor gate 720 similar to the complimentor gate 718 is provided. Conductor 712 is connected to the control grid of the pentode of the complimentor gate 720. The output conductor 717 of the AND circuit 714 is connected to the suppressor grid of the pentode of the complimentor gate 720. The pentode of the complimentor gate 720 normally has its control grid biased negatively beyond cutoff to prevent conduction in its output conductor 721.

When the blocking oscillator 702 conducts, as described above, it applies a positive potential to the control grid of the pentode of the complimentor gate 720 which would normally cause the pentode to conduct. However, in the event that the AND circuit 714 produces a negative pulse at conductor 717 consequent to the detection of the code permutation 01010 assigned to the discharge station 6, the negative pulse drives the suppressor grid sufficiently negative to prevent conduction of the pentode even though the control grid has been driven positive by the blocking oscillator 702.

Thus, it can be seen that a pulse will be produced at conductor 721 in the event that the code permutation assigned to the discharge station 6 is not detected.

Assuming for the moment that the assigned core permutation is not detected, the complimentor gate 720 will produce a pulse at the conductor 721. The output pulse from the complimentor gate 720 is passed through an input storage circuit 722 of the blocking oscillator 705. The blocking oscillator 705 is similar to the blocking oscillator 702 except that the secondary winding of the transformer providing the plate to cathode voltage is opposite in polarity to the secondary winding of the transformer in the blocking oscillator 702. By connecting the opposite polarity to the plate circuit of the thyratron of the blocking oscillator 705, the blocking oscillator 705 is capable of conduction only during those half-cycles during which the blocking oscillator 702 is not capable of conduction. Thus, oscillators 702 and 705 fire during alternate half cycles.

The input storage circuit 722 includes a conventional time delay circuit so that a pulse at conductor 721 can maintain an input signal on the blocking oscillator 705 until it can fire on the next half-cycle after blocking oscillator 702 fires to cause a pulse at the output conductor 721 of the complimentor gate 720.

When the blocking oscillator 705 fires, it produces a pulse which is extended over the conductor 723 which forms a common single turn winding for the ferrite core set 701. The pulse through the winding 723 causes any 1's marked in the ferrite cores of set 701, to be transferred back to respective ferrite cores in the set 601.

For example, if the carrier corresponding to the ferrite core set 601 was empty, the ferrite cores 604–2 to 604–6 would have been marked 00000 and the ferrite core 604–1 would be marked 1. When blocking oscillator 702 fires, the only signal that will be transferred from ferrite core set 601 to ferrite core set 701 will be from the winding 603–1 to the winding 707–1.

The only signal transferred from ferrite core set 701 to the ferrite core set 601 will be from the winding 707–1 to the winding 603–1 to again mark the ferrite core 604–1 with a "1" representative of an empty carrier.

Similarly, if the carrier corresponding to ferrite core set 601 is full and a code permutation other than that assigned to the discharge station 6 is marked in set 601, the blocking oscillator 702 will transfer the code permutations in the ferrite core set 601 to the ferrite core set 701. Subsequently, blocking oscillator 705 will fire to transfer code permutations from the ferrite core set 601.

Assume that, when the blocking oscillator 702 fired, the OR circuit 712, the complimentor gate 718 and the AND circuit 714 detected the code permuation 01010 assigned to the discharge station 6 in the manner described above.

As explained above, the AND 714 will produce a negative pulse at conductor 717 to negatively bias the suppressor grid of the pentode of the complimentor gate 720 to prevent a pulse in the output conductor 721 thereof. At the same time, the negative pulse from the AND circuit 714 is extended to the oscillator 703. The oscillator 703 can be any one of the several types well-known in the art for operating the relay 704 in response to a negative input pulse from the AND circuit 714.

The relay 704 closes contacts 704a to operate the motor start relay 724. Relay 724 closes contacts 724a to maintain itself operated over an obvious circuit including normally closed contacts 726 of an extended position sensing switch similar to switch 214 (Fig. 2). Relay 724 also closes contacts 724b and 724c to start the motor 725.

The motor 725 extends the platform of a transfer mechanism 8a to its extended position in the path of the approaching carrier. In said extended position of the platform, contacts 726 open to restore the motor start relay 724. Contacts 724b and 724c open to stop the motor 725.

When the platform of the transfer mechanism 8a moves from its retracted position toward its extended position, a retracted position switch similar to switch 212 (Fig. 2) closes contacts 727 to prepare a circuit for the motor start relay 728. Subsequently, when the approaching carrier deposits its object on the platform of the transform mechanism 8a, a tray detecting switch similar to switch 209 (Fig. 2) closes contacts 729 to complete an obvious circuit for operating the motor start relay 728.

Relay 728 closes contacts 728a and 728b to energize the motor 725. The motor 725 returns the platform of the transfer mechanism 8a to its normal retracted position. In said retracted position, the contacts 727 open to restore relay 728. Contacts 728a and 728b open to stop the motor 725. The object on the platform moves to a storage rack in a manner described above.

When the relay 704 operates the motor start relay 724 as described above, it also closes contacts 704b which extends battery potential by way of conductor 730 and brush 706-1, contact 615-1, conductor 616-1 and the winding 603-1 to ground through slip ring 605 and brush 606 to mark a "1" in the ferrite core 604-1 representative of an empty carrier.

As described above, the "1" marked in ferrite cores 604-3 and 604-5 is transferred to cores 708-3 and 708-5. The ferrite cores 604-2, 604-4, 604-6 were already marked zeros before the transfer was made.

Thus, it can be seen that the ferrite core set 601 is properly marked with "1" in core 604-1 to indicate the empty condition of its corresponding carrier 4 and "0's" in cores 604-2 to 604-6 when the carrier deposits its object on the platform of the transfer mechanism 8a at discharge station 6.

During the time interval that the brushes 706-1 to 706-8 are not in engagement with any of the contact sets 16, e.g. as soon as contacts 615-1 to 615-8 break contact with brushes 706-1 to 706-8, the synchronizing switch 9 completes a circuit for energizing an erase relay 731. Relay 731 closes contacts 731a to apply a positive signal to the input storage of the blocking oscillator 705. Shortly thereafter, the blocking oscillator 705 will operate in a manner described above to erase any 1's marked in the ferrite core set 701.

*Routing an object from the load station 5 to discharge station 6—ferrite core storage*

The routing of an object from the load station 5 to the discharge station 6 by means of the control circuits of Figs. 6 and 7, will now be described.

A discharge station selector pushbutton which selects the discharge station 6 is actuated by an operator to operate first and second relays similar to relays 320 and 334 of Fig. 3. The first relay prepares the circuits for writing a code assigned to the discharge station 6 into a ferrite core group, such as group 601, corresponding to the next empty carrier to approach the load station 5. The second relay partially prepares a circuit for operating the blocking oscillator 607.

The operator places an object to be routed to discharge station 6 upon the platform of the transfer mechanism 8 of the load station 5. The tray detecting switch of the transfer mechanism 8 senses the object and further prepares the operating circuit for the blocking oscillator 607.

As each approaching carrier reaches a predetermined position relative to the load station 5, the synchronizing switch 9 operates the synchronizing relay 612. The relay 612 completes the prepared operating circuit of the blocking oscillator 607.

Blocking oscillator 607 fires and extends a pulse from its output conductor 613 to the common winding of the ferrite core, similar to core 604-1, which indicates the full or empty condition of the approaching carrier. If the approaching carrier is full, no output pulse will be produced in the individual winding of the ferrite core similar to winding 603-1. However, in the event that the approaching carrier is empty, a pulse will be produced in the individual winding. The pulse produced in the individual winding will be extended to the oscillator 608 to cause the oscillator 608 to fire.

The oscillator 608 operates the load initiating relay 609. The load initiating relay 609 causes the code, assigned to the discharge station 6, to be written into the ferrite core group corresponding to the approaching empty carrier. The relay 609 also operates the motor start relay 618 which, in turn, causes the motor 620 to extend the platform of the transfer mechanism 8 into the path of the approaching empty carrier.

When the approaching carrier removes the object from the platform of the transfer mechanism 8, the tray detecting switch operates the motor start relay 622 which in turn causes the motor 620 to return the platform of the transfer mechanism 8 to its normal retracted position.

The carrier moves along its path toward the discharge station 6. Simultaneously, the memory drum assembly 12 rotates the contacts of the corresponding ferrite core group toward the stator brushes 706-1 and 706-3 to 706-8 of the discharge station 6.

As the carrier approaches the discharge station 6, the contacts of the ferrite core group corresponding to the carrier engage the brushes 706-1 and 706-3 to 706-8.

When the carrier reaches a predetermined position relative to the discharge station 6, the synchronizing switch 9 operates the synchronizing relay 711. A synchronizing relay 711 causes the blocking oscillator 702 to fire.

The blocking oscillator 702 produces an interrogation pulse at conductor 712 which transfers the information, stored in the ferrite core group corresponding to the approaching carrier, into the ferrite core group 701.

The OR circuit 712, the complimentor gate 718 and the AND circuit 714 detect the code permutation assigned to the discharge station 6; and consequent thereto, the AND circuit 714 applies a negative pulse to its output conductor 717 to fire the oscillator 703.

The oscillator 703 operates the unload initiating relay 704. The relay 704 operates the motor start relay 724 which in turn causes the motor 725 to extend the platform of the transfer mechanism 8a into the path of the approaching carrier. The relay 704 also marks the ferrite core group of the approaching carrier "empty."

When the approaching carrier deposits the object on the platform of the transfer mechanism 8a, the motor start relay 728 is operated by the tray detecting switch. The relay 728 causes the motor 725 to return the platform of the transfer mechanism 8a to its normal retracted position. The object then moves to an adjacent storage rack.

The synchronizing switch 9 also operates a relay 731 which in turn causes the blocking oscillator 705 to erase the information transferred to the ferrite core group 701.

*Monitor station 7 circuits—ferrite core storage*

Fig. 8 shows diagrammatically a typical gating circuit that can be used in the monitor station control circuit 33. The monitor station will be provided with sufficient gating circuits to detect all code permutations not used by the discharge stations. For purposes of the present application it is assumed that two code permutations are unused, i.e., 11100 and 00011. Only the gating circuits to detect either one of the above two code permutations are shown in Fig. 8. In all other respects, the control circuits associated with the monitor station 7 are the same as the control circuits associated with the discharge station 6 as shown in Fig. 7. Consequently, only the detection of each of the above unused code permutations will be described.

An OR circuit 801, a complimentor gate 802 and an AND circuit 803, similar to OR circuit 712, complimentor gate 718 and AND circuit 714 of the control circuit 32 (Fig. 7), are provided for detecting the unused code permutation 11100 in a manner similar to that in which the OR circuit 712, complimentor gate 718 and the AND circuit 714 detect the code permutation 01010.

An OR circuit 804, a complimentor gate 805 and an AND circuit 806 are provided for detecting the unused code permutation 00011 in a manner similar to that in which the OR circuit 12, the complimentor gate 718 and the AND circuit 714 detected the code permutation 01010.

The outputs of the two AND circuits 803 and 806 are fed to the input of a conventional OR circuit 807. If either one of the two unused codes 11100 or 00011 is detected, a negative pulse will be applied to the output conductor 808 of the OR circuit 807. The output conductor 808 of the OR circuit 807 corresponds functionally with the output conductor 717 of the AND circuit 714 (Fig. 7).

It will be remembered that, if a negative pulse is applied to the output conductor 717 of the AND circuit 714, consequent to the detection of the assigned code, an unloading operation was effected at the discharge station 6.

Similarly, if a negative pulse is applied to the output conductor 808 of the OR circuit 807 consequent to the detection of either one of the unused code permutations 11100 or 00011, an unloading operation will be effected at the monitor station 7 in a manner similar to that described with respect to the unloading operation at the discharge station 6.

More specifically, ferrite core windings 809-1, 809-5 and 809-6, similar to windings 709-1, 709-5 and 709-6 of Fig. 7, are each connected to an input of the OR circuit 801. Windings 809-2, 809-3 and 809-4, similar to windings 709-2, 709-3 and 709-4, are connected to the inputs of the AND circuit 803.

The output of the OR circuit 801 is connected to the suppressor grid of the pentode of the complimentor gate 802. A thyratron blocking oscillator (not shown) similar to oscillator 702 of Fig. 7 has its output connected to the control grid of pentode of the complimentor gate 802. The output of the complimentor gate 802 is connected to the input of the AND circuit 803.

In a manner similar to that described with respect to the OR circuit 712, the complimentor gate 718 and the AND circuit 714 of Fig. 7, the AND circuit 803 applies a signal to its output conductor 810 in the event that the unused code permutation 11100 is detected.

More specifically, the OR circuit 801 will not apply a negative potential to the conductor 811 if no pulse is generated in the winding 809-1 consequent to an interrogation pulse by the blocking oscillator (not shown) similar to oscillator 702 of Fig. 7, and if no pulse is produced in windings 809-5 or 809-6 due to zeros appearing in the last two positions of a code permutation being detected. With no negative pulse at conductor 811, the complimentor gate 802 will conduct in response to the interrogation pulse applied to its input, thereby applying a pulse to the input of the AND circuit 803.

If the interrogation pulse produces pulses in the windings 809-2, 809-3 and 809-4 due to 1's appearing in the first three positions of a code permutation being detected, the pulses will be extended to the inputs of the AND circuit 803 simultaneously with the pulse from gate 802; and a pulse will appear at the output conductor 810 of the AND circuit.

A pulse at conductor 810 will cause the OR circuit 807 to produce a pulse at its output conductor 808 to initiate an unloading operation in a manner similar to that described with respect to the discharge station 6.

Similarly, the windings 809-1, 809-2, 809-3 and 809-4 are connected to inputs of the OR circuit 804. If the interrogation pulse produces no pulse in the winding 809-1 indicating a full carrier and if no pulse is produced in any of the windings 809-2, 809-3 and 809-4 due to zeros appearing in the first three positions of the code permutation being detected the OR circuit 804 will not apply a negative pulse to its output conductor 812.

With no pulse at the conductor 812, the complimentor gate 805 conducts in response to the interrogation pulse from the blocking oscillator (not shown) similar to oscillator 702 of Fig. 7 to feed an output pulse to the AND circuit 806.

The windings 809-5 and 809-6 are connected to the inputs of the AND circuit 806. If the interrogation pulse produces pulses in the windings 809-5 and 809-6 due to 1's appearing in the last two positions of the code permutation being detected, the pulses are applied to the inputs of the AND circuit 806. With pulses applied to the AND circuit 806 simultaneously by windings 809-5 and 809-6 and complimentor gate 805, the AND circuit 806 applies a pulse to its output conductor 813. The pulse at conductor 813 causes the OR circuit 807 to apply a negative pulse to its output conductor 808 to initiate an unloading operation at the monitor station 7 in a manner similar to the unloading operation described with respect to the discharge station 6.

Thus, it can be seen that an unloading operation can be effected at the discharge station 7 in response to the detection of any one of a plurality of code permutations not used by the discharge stations, such as station 6.

It is noted that a detecting circuit, including an OR circuit such as 801, a complimentor gate, such as 802, and an AND circuit, such as 803, is provided for each unused code. It is further noted that the outputs of each of the AND circuits, such as 803, is connected to an input to the OR circuit 807.

*Supervisory station-ferrite core storage*

The ferrite core embodiment also includes a supervisory station 815 (not shown in Fig. 1), which is preferably located between the monitor station 7 and the first load station.

The purpose of the supervisory station 815 is for preventing double loading of carriers and for conditioning empty carriers for picking up loads in the event that malfunctioning of the equipment has marked a wrong code in one of the ferrite cores of storage section 34, which indicates the full or empty condition of its corresponding carrier 4.

More particularly, the supervisory station 815 includes a source of light 816 and a photosensitive device 817 which detect the full or empty condition of each carrier 4 as its approaches the station 815.

If an approaching carrier 4 is full, the light beam picked up by the photosensitive device 817 will be interrupted. The output of the device 817 will permit conduction by an amplifier 818 to maintain a relay 819 operated.

If an approaching carrier 4 is empty, the output of the photosensitive device 817 will apply a negative bias to the control grid of the amplifier 818. The amplifier 818 will be cut off and the relay 819 will restore.

Thus it can be seen that the relay 819 will be operated when the full carrier approaches the station 815 and will be restored when an empty carrier approaches.

When the relay 819 is operated, it closes contacts 819a to prepare a circuit for marking the ferrite core set of an approaching carrier "full." When the relay 819 is restored, it closes contacts 819b to prepare a circuit for marking the ferrite core set "empty" and it closes contacts 819c to prepare a circuit for erasing any code permutation (other than 00000) stored in the ferrite core set due to malfunctioning of the equipment.

As an approaching carrier reaches a predetermined position relative to the supervisory station 815, the synchronizing switch 9 operates a synchronizing relay 820.

If contacts 819a are closed when relay 820 operates, positive battery writing potential will be extended from conductor 821, over contacts 820a of the synchronizing relay 820, conductor 822, contacts 819a and the brush 823 to a contact similar to contact 615-2 (Fig. 6) to mark the ferrite core set corresponding to the approaching carrier "full."

If the contacts 819a are open and the contacts 819b and 819c are closed when the synchronizing relay 820 operates, two sequences of operations will be effected.

More specifically when relay 820 operates, it extends positive battery writing potential from conductor 821 over contacts 820a, conductor 822, closed contacts 824a of a deenergized relay 824, contacts 819c and brush 823-8 to a contact similar to contact 615-8 (Fig. 6) to write zeros in all six cores of the ferrite core set corresponding to the approaching carrier.

After a short time delay, relay 824 will operate over an obvious circuit including closed contacts 820b of the operated synchronizing relay 820.

Relay 824 opens contacts 824a in the above described writing circuit. Relay 824 also closes contacts 824b to extend positive battery writing potential from conductor 821 over contacts 820a, conductor 822, contacts 824b and 819b, and brush 823–1 to a contact corresponding to contact 615–1 (Fig. 6) to mark the ferrite core set of the approaching carrier "empty." Thus the ferrite core set of the approaching empty carrier is properly marked.

*Single cycle discharge system*

The conveyor system shown in the Figs. 9, 10, 11 and 12 illustrate the manner in which certain of the features of the systems shown in Figs. 1–8 can be utilized in a somewhat dissimilar conveyor system.

More particularly, Fig. 9 shows a horizontal conveyor 901. The conveyor 901 includes a first wheel 902 to which is connected a drive means (not shown) which rotates the wheel 902 in a counterclockwise direction with respect to Fig. 9. A second rotatedly mounted wheel 920 is provided for the conveyor, and an endless chain 903 is operatively secured to the two wheels 902 and 920. The conveyor chain 903 has secured thereto a plurality of equally spaced carriers 904.

Operatively connected to the conveyor 901 by way of a speed reducer 913 is a memory drum assembly 912 similar to the memory drum assembly 12 of Fig. 1. The memory drum assembly 912 makes one revolution for each cycle of a conveyor 901. The memory drum assembly 912 includes a slip ring and commutator section 914 similar to section 14 of Fig. 1 and an information storage section 934 similar to section 34 of Fig. 1.

The commutator and slip ring section 14 includes contact sets 916 and stator brush sets 917 similar to sets 16 and 17 respectively of Fig. 1. The commutator and slip ring section 14 also includes a pair of stator brushes 948 and 949 and slip rings 918 and 919 corresponding respectively to brushes 48 and 49 and slip rings 18 and 19 of Fig. 1.

A synchronizing switch 909 similar to the synchronizing switch 9 of Fig. 1 is operatively connected to the conveyor 901 to provide one complete cycle of the switch for movement of the carrier equal to the distance between succeeding carriers.

In the embodiment shown in Fig. 9 only one load station 905 is provided. A plurality of discharge stations such as 906 and 950 are provided along the same side of the conveyor system as the load station 905.

A control circuit 931 is provided for the load station 905. The load station 905 also includes a discharge station selector 930 similar to a selector 30 of Fig. 1.

Each discharge station is provided with a control circuit such as control circuit 932 of a discharge station 906.

In many respects, the circuits shown in Figs. 9–12 are similar to the circuits of Figs. 1–5. Where the circuits and operations are similar, the description of Figs. 9–12 will be made with less detail.

For example, the writing of discharge station code permutations in the neon tube groups of the information storage section 934 by the control circuit 931 and the discharge station selector 930 is similar to the writing of code permutations in the neon tube groups in the embodiment disclosed in Figs. 1–5. Also the operation of the synchronizing switch 909 is similar to the operation of a synchronizing switch of Figs. 1–5. Also, the circuits in Fig. 11 for detecting an assigned code permutation are similar to those disclosed in Fig. 4.

Inasmuch as the system disclosed in Figs. 9–12 does not permit recycling of objects on the conveyor, there is no necessity for a monitor station such as monitor station 7 of Fig. 1. Instead provision must be made for unloading all full carriers at the last available discharge station 950.

Instead of providing an erase means at each discharge station, it is now possible to provide a single erase station 951, Fig. 12 immediately preceding the load station 905.

Although carriers and transfer mechanisms somewhat similar to those disclosed in Figs. 1–8 could have been utilized in the system of Fig. 9, a different conventional carrier and transfer means are disclosed to illustrate the versatility of a present invention.

The carriers 904 and transfer mechanisms are conventional and will be described only briefly. Each carrier is a box-like container, the bottom of which is pivoted at one side so that when the bottom is latched closed it can carry an object and when unlatched the bottom will swing open to drop the object on a conventional storage rack below. The top of each carrier is open.

The storage rack can be of any conventional type. For example, parallel spaced rollers inclined downwardly away from the position below the path of the carriers.

A conventional electrically operated solenoid at each discharge station is utilized to unlatch the carrier bottoms. The unlatched carrier bottoms can be latched, for example, at the erase station 951 by an arm 952 projecting into the path of the carriers.

The load station 905 includes a suitable platform positioned closely adjacent to the path of the carriers 904. When a carrier is to be loaded, a conventional solenoid 957 pushes an object from the platform of the load station 905 into the adjacent carrier.

*Load station 905 circuits*

The circuits of Figs. 9–12 will now be described in detail.

When an object is to be routed from the load station 905 to one of the discharge stations, for example, station 906, an operator at the load station 905 places the object on the station platform and actuates the appropriate pushbutton of the selector 930.

Placing the object on the platform operates an object detecting switch (not shown), similar to the switch 209 of Fig. 2, which closes contacts 953. Actuation of the pushbutton of the selector 930 causes a relay, similar to relay 334 of Fig. 3, to close contacts 954.

The closure of contacts 953 and 954 prepares a circuit for a load initiating relay 955. Inasmuch as all carriers approaching the load station 905 are empty, there is no necessity for detecting an empty carrier.

Consequently, when the next approaching carrier reaches a predetermined position relative to the load station 905, the synchronizing switch 909 operates a synchronizing relay 956. The synchronizing relay 956 closes contacts 956a to operate the load initiating relay 955 over an obvious circuit.

Relay 955 closes contacts 955a to operate the load solenoid 957 over an obvious circuit. The load solenoid 957 pushes the object from the load station platform into the approaching carrier.

When the load initiating relay 955 operates as described above, it also closes contacts 955b to write the code, assigned to the selected discharge station, for example station 906, into the neon tube group corresponding to the approaching carrier, for example tube group 958.

More particularly when the discharge station selector 930 is operated as described above, it causes the closure of three contacts in circuit 959, similar to contacts 320a, 320b and 320c of Fig. 3, to prepare the circuits for writing the assigned code 1100100 into the neon tube group of the approaching carrier.

A "1" in the code permutation represents a conducting neon tube at the respective position in the tube group. A "0" in the code permutation represents a nonconducting neon tube at the respective position in the tube group.

The closure of contacts 955b described above extends a negative battery writing potential through a resistance 960, the prepared writing circuits 959, brushes 961–1, 961-2 and 961-5 to the cathodes of neon tubes 964-1, 964-2 and 964-5 to fire the neon tubes. Thus the code 1100100 is stored in the tube group 958.

When the load initiating relay 955 operates as described above, it also closes contacts 955c to operate a restoring relay 962 over an obvious circuit. The restoring relay 962 closes contacts 962a to restore the selector 930 in a manner similar to the restoration of the selector 30 of Fig. 1.

Thus, the restoring relay 962 restores the selector 930a short time after the assigned code is written into the neon tube group of the approaching carrier.

The relays 955, 956, 957 and 962 are restored as soon as the synchronizing switch 909 restores the synchronizing relay 956.

The coded carrier moves toward the selected discharge station 906. Simultaneously, the contacts of 965-1 to 965-7 of the neon tube group 958 are rotated toward the stator brushes 963-1 to 963-7 (Fig. 11) associated with the discharge station 906.

Discharge station 906 circuits

When the contacts 965-1 to 965-7 engage the brushes 963-1 to 963-7, the positive 30 volt potential at the cathodes of the conducting neon tubes 964-1, 964-2 and 964-5 will be detected by the assigned code relay 967 to initiate an unloading operation.

More particularly, when the loaded carrier reaches a predetermined position relative to the discharge station 906, the synchronizing switch 909 will operate a synchronizing relay 968 over an obvious circuit. The synchronizing relay 968 opens contacts 968a to remove a shunt from the assigned code detecting relay 967.

Relay 967 operates over a circuit extending from ground through the relay 967, conductor 969, diodes 970-1, 970-2 and 970-5, brushes 963-1, 963-2 and 963-5 and contacts 965-1, 965-2 and 965-5 to the positive 30 potential at the cathodes of the neon tubes 964-1, 964-2 and 964-5.

When the assigned code detecting relay 967 operates, it closes contacts 967a to operate a power slave relay 971. The slave relay 971 closes contacts 971a to operate a discharge solenoid 972 over an obvious circuit.

The discharge solenoid 972 unlatches the bottom of the loaded carrier to cause the object in the carrier to be dropped on the storage rack of the discharge station 906.

Thus, it can be seen that, consequent to an operator placing an object on the platform of the load station 905 and operating a desired pushbutton of the selector 930, the object can be automatically routed to a desired discharge station.

Station 951 and 950 circuits

After the carrier unloaded the object at the discharge station 906, as described above, it continues to move along its path. When the carrier reaches a predetermined position relative to erase station 951, the synchronizing switch 909 operates a synchronizing relay 973 in control circuit 977 (Fig. 12) over an obvious circuit.

The synchronizing relay 973 closes contacts 973a to extend a positive battery erase potential through resistances 974-1 to 974-7, stator brushes 975-1 to 975-7 and contacts 965-1 to 965-7 to the cathodes of the neon tubes 964-1 to 964-7 to erase the code permutation previously written in the neon tube group 958.

Also, as the carrier passes the erase station 951 the arm 952 will engage the bottom of the carrier to again latch the bottom in its closed position. The carrier is now in condition to receive another object.

The last discharge station 950 (Fig. 9) has associated therewith control circuits 977 (Fig. 9) for causing the loading of all loaded carriers approaching the station.

More particularly, the discharge station 950 includes a switch 976 for mechanically sensing the latched or unlatched condition of the bottom of each carrier approaching a discharge station 950. The switch 976 has normally closed contacts 976a.

If a loaded carrier approaches the discharge station 950, its bottom will be latched and will not engage the switch 976. Consequently the contacts 976a will remain closed. When the carrier reaches a predetermined position relative to the discharge station 950, the synchronizing switch 909 will complete an obvious circuit in energizing the discharge solenoid 978. The discharge solenoid 978 unlatches carrier bottom and the object held in carrier is dropped on the storage rack of the discharge station 950.

In the event that an empty carrier, the bottom of which is not unlatched, approaches the discharge station 950, the same sequence of operations described above for a full carrier will be performed to unlatch the carrier bottom.

In the event that an approaching carrier has been unloaded at a previous discharge station, its bottom will be open as it approaches the discharge station 950. The carrier bottom will engage the actuating arm of the switch 976 to open the contacts 976a. Consequently, when the synchronizing switch 909 closes the contacts in the circuit of the discharge solenoid 978, the solenoid 978 cannot energize.

While there have been described what is at present believed to be the preferred embodiments of the invention, it will be understood that various charges and modifications may be made therein; and it is contemplated to cover in the appended claims all such changes and modifications as fall within the true spirit and scope of the invention.

What is claimed is:

1. A semi-automatic conveyor system of the type in which a prime mover drives an endless conveyor chain having a plurality of load transporting carriers secured thereto for movement in a predetermined path, in which at least one load station and a plurality of discharge stations are adjacent said path, and in which a timer controlled by an operator at the load station operates to cause an object to be deposited on the first empty carrier approaching the load station after actuation of the timer and to be delivered to any discharge station selected by the operator, said system characterized by the combination therewith of a synchronizing device having a sequence of operating conditions corresponding to succeeding positions at the load station, the synchronizing device operated in synchronism with the movement of the carrier past said positions rendering the timer effective to cause the object to be deposited on the carrier at a load station position corresponding to a selected one of the operating conditions of the synchronous device.

2. A semi-automatic conveyor system of the type in which a prime mover drives an endless conveyor chain having a plurality of load transporting carriers on the chain for travel in a predetermined path, in which at least one load station and a plurality of discharge station adjacent said path have individually associated therewith transfer mechanisms adapted for movement into the path to place objects on and to remove objects from the carriers, and in which a timer controlled by an operator at the load station causes the associated transfer mechanism to place a waiting object on the first empty carrier approaching the load station after actuation of the timer, causes a binary code permutation assigned to a selected discharge station to be stored in a storage device, causes the assigned code permutation to be detected when the carrier approaches the selected discharge station and causes the transfer mechanism associated with the selected discharge station to remove the object consequent to the detection of the code permutation, said system characterized by the combination therewith of a synchronizing device having a sequence of operating conditions corresponding to succeeding positions at the load station, the synchronizing device operated in synchronism with the movement of the empty carrier past said positions rendering the timer effective to cause an assigned code to be stored in the storage device only when the empty carrier is in a load station position corresponding to a selected one of the operating conditions of the synchronous device.

3. A semi-automatic conveyor system of the type in which a prime mover drives an endless conveyor chain having a plurality of load transporting carriers secured thereto for movement in a predetermined path, in which at least one load station and a plurality of discharge stations are adjacent said path, and in which a timer controlled by an operator at the load station operates to cause an object to be deposited on the first empty carrier approaching the load station after actuation of the timer and to be delivered to any discharge station selected by the operator, said system characterized by the combination therewith of a synchronizing device having a sequence of operating conditions corresponding to succeeding positions at the discharge station, the synchronizing device operated in synchronism with the movement of the carrier past said positions rendering the timer effective to cause the object to be removed from the carrier at a selected discharge station position corresponding to a selected one of the operating conditions of the synchronous device.

4. A semi-automatic conveyor system of the type in which a prime mover drives an endless conveyor chain having a plurality of load transporting carriers on the chain for travel in a predetermined path, in which at least one load station and a plurality of discharge stations adjacent said path have individually associated therewith transfer mechanisms adapted for movement into the path to place objects on and to remove objects from the carriers, and in which a timer controlled by an operator at the load station causes the associated transfer mechanism to place a waiting object on the first empty carrier approaching the load station after actuation of the timer, causes a binary code permutation assigned to a selected discharge station to be stored in a storage device, causes the assigned code permutation to be detected when the carrier approaches the selected discharge station and causes the transfer mechanism associated with the selected discharge station to remove the object consequent to the detection of the code permutation, said system characterized by the combination therewith of a synchronizing device having a sequence of operating conditions corresponding to succeeding positions at the selected discharge station, the synchronizing device operated in synchronism with the conveyor system rendering the timer effective to cause detection of the stored code permutation only when the approaching carrier reaches a selected discharge station position corresponding to a selected one of the operated conditions of the synchronizing device.

5. A semi-automatic conveyor control system of the type in which a prime mover drives an endless conveyor chain having a plurality of load transporting carriers secured thereto for movement in a predetermined path, in which at least one load station and a plurality of discharge stations are adjacent said path, and in which a timer controlled by an operator at the load station operates to cause an object to be deposited on a first empty carrier approaching the load station after actuation of the timer and to cause the object to be delivered to any discharge station selected by the operator, said system characterized by the combination therewith of a synchronizing device having a sequence of operating conditions corresponding to succeeding positions at the load and discharge stations, the synchronizing device operated in synchronism with the movement of the carriers past the positions rendering the timer effective to cause the object to be deposited on the carrier at a load station position corresponding to a selected one of the operating conditions of the synchronizing device and to cause the object to be removed from the carrier at a selected discharge station position corresponding to a selected one of the operating conditions of the synchronizing device.

6. A conveyor system of the type in which a prime mover drives an endless conveyor chain having a plurality of load transporting carriers on said chain for travel in a predetermined path, in which at least one load station and a plurality of discharge stations adjacent said path have individually associated therewith transfer mechanisms adapted for movement into said path to place objects on and remove objects from the carriers, and in which a timer controlled by an operator at the load station causes the associated transfer mechanism to place a waiting object on the first empty carrier approaching the load station after actuation of the timer and causes the transfer mechanism associated with a discharge station selected by the operator to remove the object as said carrier passes said selected discharge station, said system characterized by the combination therewith of a synchronizing device having a sequence of operating conditions corresponding to succeeding positions at the stations, the synchronizing device operated in synchronism with the conveyor system for rendering the timer effective to cause the operation of each one of the transfer mechanisms only when an approaching carrier is in a respective station position corresponding to a respective selected one of the operating conditions of the synchronizing device.

7. A semi-automatic conveyor system of the type in which a prime mover drives an endless conveyor chain having a plurality of load transporting carriers secured thereto for movement in a predetermined path, in which at least one load station and a plurality of discharge stations are adjacent said path, and in which a timer controlled by an operator at the load station operates to cause an object to be deposited on the first empty carrier approaching the load station after actuation of the timer and to be delivered to any discharge station selected by the operator, said system characterized by the combination of a synchronizing device individual to each station having a sequence of operating conditions corresponding to succeeding positions at the station, the synchronizing device operated in synchronism with the movement of carriers past said positions for rendering the timer effective to initiate loading and unloading operations when the carriers reach positions adjacent each load and discharge station corresponding to respectively selected ones of the operating conditions of the synchronizing device.

8. A conveyor system of the type in which a prime mover drives an endless conveyor chain having a plurality of load transporting carriers on the chain for travel in a predetermined path, in which at least one load station and a plurality of discharge stations adjacent said path have individually associated therewith transfer mechanisms adapted for movement into the path to place objects on and remove objects from the carriers, and in which a timer controlled by an operator at the load station causes the associated transfer mechanism to place a waiting object on the first empty carrier approaching the load station after actuation of the timer and causes the transfer mechanism associated with a discharge station selected by the operator to remove the object as the carrier passes the selected discharge station, said system characterized by the combination therewith of a synchronizing device individual to each station having a sequence of operating conditions corresponding to succeeding positions at the station, the synchronizing device operated in synchronism with the movement of the carriers past the positions for rendering the timer effective to cause the operation of each respective transfer mechanism only when an approaching carrier is in a respective station position corresponding to a selected one of the operating conditions of the synchronizing device.

9. A conveyor system of the type in which a prime mover drives an endless conveyor chain having a plurality of load transporting carriers on said chain for travel in a predetermined path, in which at least one load station and a plurality of discharge stations adjacent said path have individually associated therewith transfer mechanisms adapted for movement into said path to place objects on and remove objects from the carriers, and in which a timer controlled by an operator at the load station causes the associated transfer mechanism to place a waiting object on the first empty carrier approaching the load station after actuation of the timer and causes the transfer mechanism associated with a discharge station selected by the operator to remove the object as said carrier passes said selected discharge station, said system characterized by the combination therewith of a synchronizing device comprising: a switch including a wiper and a set of wiper contacts corresponding to succeeding positions at one of the stations, means causing movement of the wiper across its contact set during movement by the conveyor chain a distance equal to the spacing between carriers and coincident with the movement of the carriers past said positions, and circuits including a selected contact in the set for rendering the timer effective to initiate operation of the transfer mechanism of the one station only when an approaching carrier reaches a station position corresponding to the selected contact.

10. A conveyor system of the type in which a prime mover drives an endless conveyor chain having a plurality of load transporting carriers on the chain for travel in a predetermined path, in which at least one load station and a plurality of discharge stations adjacent said path have individually associated therewith transfer mechanisms adapted for movement into the path to place objects on and remove objects from the carriers and in which a timer controlled by an operator at the load station causes the associated transfer mechanism to place a waiting object on the first empty carrier approaching the load station after actuation of the timer, causes a binary code permutation assigned to a selected discharge station to be stored in a storage device, causes the assigned code permutation to be detected when the carrier approaches the selected discharge station and causes the transfer mechanism associated with the selected discharge station to remove the object consequent to the detection of the code permutation, said system characterized by the combination therewith of a synchronizing device comprising: a multilevel electrical switch having a plurality of poistions, each level of the switch corresponding to one of the stations and corresponding positions of the switch corresponding to succeeding positions at the stations; means for operating the switch in synchronism with the carriers to provide one cycle of the switch for movement of the carriers a distance equal to the spacing between carriers; and circuit means controlled by each level of the switch in a respective predetermined switch position for rendering the timer effective to initiate the operation of the transfer mechanism of the respective station and for rendering the timer effective to write an assigned code permutation into or detect the presence of an assigned code permutation in the storage device when an approaching carrier reaches a station position corresponding to the predetermined switch position.

11. A conveyor system of the type in which a prime mover drives an endless conveyor chain having a plurality of spaced load transporting carriers on the chain for travel in a predetermined path, in which at least one load station and a plurality of discharge stations adjacent said path have individually associated therewith transfer mechanisms adapted for movement into the path to place objects on and remove objects from the carriers, and in which a timer controlled by the operator at the load station causes the associated transfer mechanism to place a waiting object on the first empty carrier approaching the load station after actuation of the timer, causes a binary code permutation assigned to a selected discharge station to be stored in a storage device, causes the assigned code permutation to be detected when the carrier approaches the selected discharge station and causes the transfer mechanism associated with the selected discharge station to remove the object consequent to the detection of the code permutation, said system characterized by a monitor circuit comprising means for physically detecting the full or empty condition of each carrier as it passes a predetermined monitor station, circuits effective when a full carrier is detected for detecting the presence of code permutations in the storage device other than those assigned to the discharge stations, a transfer mechanism associated with the monitor station and effective upon the detection of an unassigned code permutation for unloading a full carrier and for erasing the unassigned code, and circuits effective upon the detection of an empty carrier for writing a code permutation representative of an empty carrier in the storage device.

12. The combination claimed in claim 11 wherein the means for detecting the full or empty condition of each carrier comprises a photosensitive device, a source of light for the photosensitive device, and a bistable electrical device operated in one manner when empty carrier passes photosensitive device and operated in another manner when a full carrier passes the photosensitive device to interrupt the light passing from the source toward the photosensitive device.

13. A semi-automatic control system for an endless conveyor of the type having at least one load station, a plurality of discharge stations, a plurality of load transporting carriers, and transfer mechanisms at each load and discharge station for transferring objects to and from the carriers, said control system comprising: a discharge station selector at each load station; a rotatably mounted memory drum assembly including multi-channel information storage section having a group of bistable electrical devices corresponding to each carrier; means for rotating said drum assembly in synchronism with the conveyor; control circuits individual to each load station for causing the respective transfer mechanism to place a waiting object on the first empty carrier approaching the station after actuation of the respective discharge station selector and for sending coded signals to the bistable device group corresponding to said carrier; control circuits individual to each discharge station for detecting an assigned code in any one of said bistable device groups; control circuits individual to each discharge station for causing the respective transfer mechanism to remove the object from the respective carrier consequent to the detection of an assigned code; and a synchronizing device for each station operated in synchronism with the conveyor for rendering the first-mentioned and second-mentioned control circuits effective when approaching carriers are in a predetermined one of a plurality of available positions relative to each load and discharge station.

14. In an endless conveyor system having load-transporting carriers moved in a predetermined path, and having at least one load station and a plurality of discharge stations spaced along said path, said stations being provided with transfer mechanisms for loading objects on and unloading objects from the carriers, respectively, an improved control system comprising: a rotatably mounted memory drum assembly including a multi-channel information storage section having a group of neon tubes corresponding to each carrier, mechanism operatively connecting said storage means to said conveyor, a discharge station selector at each load station, control circuits associated with each load station for causing the respective transfer mechanism to place a waiting object on the first empty carrier approaching the station after actuation of the respective discharge station selector and for writing a selected assigned code permutation in the neon tube group corresponding to the carrier approaching the load station, control circuits at each discharge station for detecting its assigned code permutation in any one of the neon tube groups, and control circuits at each discharge station effective upon the detection of its respective assigned code for causing its associated transfer mechanism to remove an object from the carrier approaching the discharge station.

15. The combination claimed in claim 14 wherein each of the load station control circuits includes circuit means for detecting the full or empty condition of each carrier approaching the respective load station, each said circuit means comprising: a bistable electrical load initiating device, a circuit normally effective for operating said device in one manner, and circuits connecting said device to each neon tube group as the respective carrier approaches the respective load station for operating the load initiating device in another manner in response to its connection to a neon tube group having a code permutation other than the code permutation representative of an empty carrier.

16. The combination claimed in claim 14 wherein each of the discharge station control circuits comprises: a bistable electrical device for initiating an unloading operation, and circuits connecting the device to predetermined neon tubes in each neon tube group as the respective carrier approaches the respective discharge station, said connecting circuits effective for operating said device to initiate an unloading operation in the event that said predetermined neon tubes are marked in a manner representative of the code permutation assigned to the respective discharge station.

17. The control system claimed in claim 14 wherein each assigned code permutation comprises marking a predetermined number of neon tubes in a group, and wherein the conveyor includes a monitor station adjacent the carrier path and a transfer mechanism at the monitor station, said system also comprising circuits individual to the monitor station for detecting all code permutations in the neon tube groups having fewer than said predetermined number of neon tubes marked, and circuits controlled by the last-mentioned detecting circuits for causing the monitor transfer mechanism to remove objects from the carriers corresponding to the neon tube groups having fewer than said predetermined number of neon tubes marked.

18. The combination claimed in claim 17 together with means for detecting the physical presence or absence of an object on each carrier as it passes the monitor station, and circuits controlled by the physical detecting means for rendering the last mentioned code permutation detecting circuits effective only when a full carrier is physically detected.

19. The combination claimed in claim 18 wherein the physical detecting means comprises a source of light and a photosensitive device disposed in relation to the carrier path to cause objects on the carrier to momentarily interrupt the light path between the source and the photosensitive device.

20. A semi-automatic control system for an endless conveyor having at least one load station, a plurality of discharge stations, a plurality of load transporting carriers, and a transfer mechanism at each load and discharge station for transferring objects to and from the carriers respectively, said control system comprising: a discharge station selector at each load station; a rotatably mounted memory drum assembly including a multi-channel information storage section having a group of neon tubes corresponding to each carrier; mechanism for rotating the drum assembly in synchronism with the conveyor, control circuits individual to each load station for causing the respective transfer mechanism to place a waiting object on the first empty carrier approaching the station after actuation of the respective selector and for sending to the respective neon tube group signals of a code permutation assigned to a selected discharge station; control circuits individual to each discharge station for detecting a respective assigned code in any one of the neon tube groups and for causing the respective transfer mechanism to remove the object from the respective carrier, and a synchronizing device for each station operated in synchronism with the conveyor for rendering effective the first-mentioned and second-mentioned control circuits only when approaching carriers are in a predetermined one of a plurality of available positions relative to each load and discharge station.

21. The combination claimed in claim 20 wherein each of the control circuits individual to a load station includes circuit means for detecting the full or empty condition of each carrier approaching the respective load station, each said circuit means comprising: a bistable electrical, load initiating device, a circuit normally effective for operating said device in one manner, and circuits connecting said device to each neon tube group as the respective carrier approaches the respective load station for operating the load initiating device in another manner in response to its connection to a neon tube group having a code permutation other than the code permutation representative of an empty carrier.

22. The combination claimed in claim 20 wherein each of the control circuits individual to a discharge station comprises: a bistable electrical device for initiating an unloading operation, and circuits connecting the electrical device to predetermined neon tubes in each neon tube group as the respective carrier approaches the respective discharge station, said connecting circuits effective for operating said device to initiate an unloading operation in the event that said predetermined neon tubes are marked in a manner representative of the code permutation assigned to the respective discharge station.

23. The control system claimed in claim 20 wherein each assigned code permutation comprises marking a predetermined number of neon tubes in a group, and wherein the conveyor includes a monitor station adjacent the carrier path and a transfer mechanism at the monitor station, said system also comprising circuits individual to the monitor station for detecting all code permutations in the neon tube groups having fewer than said predetermined number of neon tubes marked, and circuits controlled by the last-mentioned detecting circuits for causing the monitor transfer mechanism to remove objects from the carriers corresponding to the neon tube groups having fewer than said predetermined number of neon tubes marked.

24. The combination claimed in claim 23 together with a synchronizing device for the monitor station operated in synchronism with the conveyor for rendering the last-mentioned circuits effective only when each approaching carrier reaches a predetermined one of a plurality of available positions adjacent the monitor station.

25. The combination claimed in claim 23 together with means for detecting the physical presence or absence of an object on each carrier as it passes the monitor station, and circuits controlled by the physical detecting means for rendering the last-mentioned code permutation detecting circuits effective only when a full carrier is physically detected.

26. The combination claimed in claim 25 wherein the physical detecting means comprises a source of light and a photosensitive device disposed in relation to the carrier path to cause objects on the carrier to momentarily interrupt the light path between the source and the photosensitive device.

27. A semi-automatic control system for an endless conveyor having at least one load station, a plurality of discharge stations, a monitor station, a plurality of load transporting carriers, a transfer mechanism at each load station for transferring objects to the carriers, and a transfer mechanism at each discharge station and at the monitor station for transferring objects from the carriers, said control system comprising: a discharge station selector at each load station, a rotatably mounted memory drum assembly including a multi-channel information storage section having a group of ferrite cores corresponding to each carrier, mechanism for rotating the drum assembly in synchronism with the conveyor, control circuits individual to each load station for causing the respective transfer mechanism to place a waiting object on the first empty carrier approaching the station after actuation of the respective selector and for writing a selected one of a plurality of assigned code permutations in the respective ferrite core group, control circuits individual to each discharge station for detecting a respective assigned code in any one of the ferrite core groups and for causing the respective transfer mechanism to remove an object from the respective carrier consequent to the detection of an assigned code, and control circuits individual to the monitor station for detecting unassigned code permutations in the ferrite core groups and for causing the respective transfer mechanism to remove objects from the carriers corresponding to ferrite core groups having unassigned codes marked therein.

28. A semi-automatic control system for an endless conveyor having at least one load station, a plurality of discharge stations, a supervisory station, a plurality of load transporting carriers, a transfer mechanism at each load station for transferring objects to the carriers, and a transfer mechanism at each discharge station for transferring objects from the carriers, said control system comprising: a discharge station selector at each load station, a rotatably mounted memory drum assembly including a multi-channel information storage section having a group of ferrite cores corresponding to each carrier, mechanism for rotating the drum assembly in synchronism with the conveyor, control circuits individual to each load station for causing the respective transfer mechanism to place a waiting object on the first empty carrier approaching the station after actuation of the respective selector and for writing a selected one of a plurality of assigned code permutation in the respective ferrite core group, control circuits individual to each discharge station for detecting a respective assigned code in any one of the ferrite core groups and for causing the respective transfer mechanism to remove an object from the respective carrier consequent to the detection of an assigned code, a supervisory circuit for detecting the physical presence or absence of an object on each carrier as it passes the supervisory station, and circuits controlled by the supervisory circuit for marking each ferrite core group in a manner representative of the actual physical full or empty condition of the carrier.

29. A semi-automatic control system for an endless conveyor having at least one load station, a plurality of discharge stations, a plurality of load transporting carriers, and a transfer mechanism at each load and discharge station for transferring objects respectively to and from the carriers, said control system comprising: a discharge station selector at each load station; a rotatably mounted memory drum assembly including a multi-channel information storage section having a group of ferrite cores corresponding to each carrier; mechanism for rotating the drum assembly in synchronism with the conveyor; control circuits individual to each load station for causing the respective transfer mechanism to place a waiting object on the first empty carrier approaching the station after actuation of the respective selector and for writing a selected, assigned code permutation in the respective ferrite core group; and control circuits individual to each discharge station for detecting a respective assigned code in any one of the ferrite core groups and for causing the respective transfer mechanism to remove an object from the respective carrier consequent to the detection of an assigned code.

30. A semi-automatic control system for an endless conveyor having at least one load station, a plurality of discharge stations, a plurality of load transporting carriers, and a transfer mechanism at each load and discharge station for transferring objects respectively to and from the carriers, said control system comprising: a discharge station selector at each load station; a rotatably mounted memory drum assembly including a multi-channel information storage section having a group of ferrite cores corresponding to each carrier; mechanism for rotating the drum assembly in synchronism with the conveyor; control circuits individual to each load station for causing the respective transfer mechanism to place a waiting object on the first empty carrier approaching the station after actuation of the respective selector and for writing a selected, assigned code permutation in the respective ferrite core group; control circuits individual to each discharge station for detecting a respective assigned code in any one of the ferrite core groups and for causing the respective transfer mechanism to remove an object from the respective carrier consequent to the detection of an assigned code; and a synchronizing device for each station operated in synchronism with a conveyor for rendering the control circuits effective when approaching carriers are in a predetermined one of a plurality of available positions relative to each load and discharge station.

31. The combination claimed in claim 30 wherein each of the control circuits individual to a load station includes circuit means for detecting the full or empty condition of each carrier approaching the respective load station, said circuit means comprising: a blocking oscillator operated by the respective synchronizing device; a load initiating device; and a ferrite core in each of the ferrite core groups marked in one manner when its respective carrier is empty and marked in another manner when its respective carrier is full, said ferrite core responsive to the operation of the blocking oscillator when marked in said one manner for operating the load initiating device.

32. The combination claimed in claim 30 wherein each of the control circuits individual to a discharge station comprises: a temporary storage unit including a group of ferrite cores; a blocking oscillator, operated by the respective synchronizing device as each carrier approaches the respective discharge station, for transferring code permutations from the respective memory drum ferrite core groups to the temporary storage unit; an unload initiating means; circuits effective upon the transfer of the respective assigned code permutation to the temporary storage unit for operating the unload initiating means; and a blocking oscillator effective upon the transfer of a code permutation other than the respective assigned code permutation to the temporary storage unit to transfer the other code permutation back to the respective ferrite core group of the memory drum assembly.

33. The combination claimed in claim 32 together with circuit means rendering the blocking oscillator effective to erase a respective assigned code permutation from the temporary storage unit subsequent to its detection.

34. The combination claimed in claim 30 together with a monitor station adjacent the carrier path; a transfer mechanism at the monitor station; control circuits individual to the monitor station for detecting all unassigned code permutations in the ferrite core groups and for causing the respective transfer mechanism to remove objects from the carriers corresponding to ferrite core groups having unassigned codes marked therein; and a synchronizing device for the monitor station operated in synchronism with the conveyor for rendering the last-mentioned control circuits effective only when each approaching carrier reaches a predetermined one of a plurality of available positions adjacent the monitor station.

35. The combination claimed in claim 30 together with a supervisory circuit comprising: means for detecting the physical presence or absence of an object on each carrier as it passes a predetermined location in the carrier path; circuits controlled by the physical detecting means for marking a predetermined core in each ferrite core group in a manner representative of the actual physical full or empty condition of the carrier; and a synchronizing device individual to the supervisory circuit for rendering the marking circuits effective only when each approaching carrier reaches a predetermined one of a plurality of positions adjacent a supervisory station.

36. The combination claimed in claim 35 wherein the means for detecting the physical presence or absence of an object on each conveyor comprises a source of light and a photosensitive device disposed in relation to the carrier path to cause objects on the carrier to momentarily interrupt the light path between the source and the photosensitive device.

37. In a conveyor system of the type in which a timer is operated in synchronism with the movement of a conveyor to operate a transfer mechanism to place an object on a conveyor at a load station for movement to a selected one of a plurality of discharge stations adjacent a path traversed by the conveyor, the combination with the timer of a second timer having a sequence of operating conditions corresponding to succeeding positions available at the load station, the second timer sequentially operated through its conditions in synchronism with the movement of the conveyor for rendering the first-mentioned timer effective to cause the placing of the object on the conveyor at a load station position corresponding to a selected one of the second timer conditions.

38. In a conveyor system of the type in which an object at a loading position is placed on a conveyor for movement to a selected one of a plurality of discharge stations adjacent a path traversed by the conveyor and in which a first timing means is operated in synchronism with the movement of the conveyor to operate a transfer mechanism to remove the object at its selected station, the combination with the timing means of apparatus having a sequence of operating conditions corresponding to succeeding positions available at the selected station, the apparatus sequentially operated through its conditions in synchronism with the movement of the object past the station positions for rendering the timing means effective to cause the removal of the object at a station position corresponding to a selected one of the second timer conditions.

39. In a conveyor system of the type in which objects at a loading station are placed at equally spaced positions on a conveyor for movement to selected discharge stations adjacent a path traversed by the conveyor and in which a first timer operated in synchronism with the movement of the conveyor causes a transfer mechanism to remove the objects at their selected discharge stations, the combination with the timer of a second timer having a sequence of operating conditions corresponding to succeeding positions available at the discharge stations, the second timer sequentially operated through its conditions in synchronism with the movement of the objects past the station positions as the conveyor moves a distance equal to the spacing between conveyor positions and rendering the first-mentioned timer effective to cause the removal of the objects at station positions corresponding to selected second timer conditions.

References Cited in the file of this patent

UNITED STATES PATENTS

| | | |
|---|---|---|
| 1,900,603 | Gotthardt | Mar. 7, 1933 |
| 2,227,778 | Fischbach | Jan. 7, 1941 |
| 2,670,087 | Stehlik | Feb. 23, 1954 |

FOREIGN PATENTS

| | | |
|---|---|---|
| 741,124 | Great Britain | Nov. 30, 1955 |

UNITED STATES PATENT OFFICE

CERTIFICATE OF CORRECTION

Patent No. 2,923,420            February 2, 1960

John H. Dyer et al.

It is hereby certified that error appears in the printed specification of the above numbered patent requiring correction and that the said Letters Patent should read as corrected below.

Column 21, line 65, for "core" read -- code --; column 22, line 38, for "permuation" read -- permutation --; column 30, line 28, for "charges" read -- changes --; column 38, line 28, for "ech" read -- each --.

Signed and sealed this 26th day of July 1960.

(SEAL)

Attest:

KARL H. AXLINE            ROBERT C. WATSON
Attesting Officer            Commissioner of Patents